US005534344A

United States Patent [19]

Kisu et al.

[11] Patent Number: 5,534,344

[45] Date of Patent: Jul. 9, 1996

[54] CHARGING MEMBER HAVING A LOOSELY SUPPORTED CHARGER PORTION

[75] Inventors: Hiroki Kisu, Fujisawa; Masaharu Ohkubo, Yokohama; Kazushige Sakurai; Michihito Yamazaki, both of Tokyo; Erika Asano, Kawasaki; Yasushi Shimizu, Tokyo; Hiroaki Ogata, Kawasaki, all of Japan

[73] Assignee: Canon Kabushiki Kaisha, Tokyo, Japan

[21] Appl. No.: 10,870

[22] Filed: Jan. 29, 1993

[30] Foreign Application Priority Data

Jan. 30, 1992 [JP] Japan .................................... 4-040141

[51] Int. Cl.[6] ........................................................ B32B 5/16

[52] U.S. Cl. .......................... 428/323; 355/219; 355/274; 355/275; 355/276; 361/221; 361/223; 361/225; 361/234

[58] Field of Search .................................... 355/274, 275, 355/277, 211, 219, 297, 200, 210, 77, 271, 276, 273, 278; 361/220, 221, 225, 230, 233; 428/320.2, 323, 321.5

[56] References Cited

U.S. PATENT DOCUMENTS

| | | | |
|---|---|---|---|
| 4,959,688 | 9/1990 | Kaisha . | |
| 5,034,777 | 7/1991 | Ohzeki et al. | 355/274 |
| 5,060,014 | 10/1991 | Adachi et al. | 355/211 |
| 5,089,851 | 2/1992 | Tanaka et al. | 355/219 |
| 5,126,913 | 6/1992 | Araya et al. | 361/225 |
| 5,144,368 | 9/1992 | Ohzeki et al. | 355/219 |
| 5,305,177 | 4/1994 | Aoki et al. | 361/225 |

FOREIGN PATENT DOCUMENTS

| | | |
|---|---|---|
| 329366 | 8/1989 | European Pat. Off. . |
| 0329366 | 8/1989 | European Pat. Off. . |
| 0439168 | 7/1991 | European Pat. Off. . |
| 458273 | 11/1991 | European Pat. Off. . |
| 0458273 | 11/1991 | European Pat. Off. . |
| 56-91253 | 7/1981 | Japan . |
| 56-104349 | 8/1981 | Japan . |
| 56-165166 | 12/1981 | Japan . |
| 63-149669 | 6/1988 | Japan . |

*Primary Examiner*—Patrick J. Ryan
*Assistant Examiner*—Merrick Dixon
*Attorney, Agent, or Firm*—Fitzpatrick, Cella, Harper & Scinto

[57] ABSTRACT

A charging member contactable to a member to be charged to electrically charge it includes a charging portion contactable to the member to be charged; a supporting portion for supporting the charging portion, the supporting portion including an elastic layer and a supporting member for supporting the elastic layer; wherein the charging portion is movable toward and away from the supporting portion, and an inside diameter of the charging portion is larger than an outside diameter of the supporting portion.

32 Claims, 22 Drawing Sheets

CHARGING MEMBER HAVING A LOOSELY SUPPORTED CHARGER PORTION

FIELD OF THE INVENTION

The present invention relates to an image forming apparatus such as an electrophotographic apparatus or an electrostatic recording apparatus, a charging member, a charging device and a process cartridge usable with the image forming apparatus.

DESCRIPTION OF THE RELATED ART

In the following description, an electrophotographic apparatus (copying machine, printer or the like) and an electrostatic recording apparatus are taken as an example.

In an image forming apparatus such as an electrophotographic apparatus, the means for charging (discharging) an image bearing member in the form of an electrophotographic photosensitive member or an electrostatic recording dielectric member or the like, has been a corona discharger of non-contact charging type including a wire and a shield.

The corona discharger is advantageous in uniform charging performance. However, it involves the disadvantages that an expensive high voltage source is required, that a large space is required, a shielding space is required for a high voltage source or the like, that a relatively large amount of corona product such as ozone is produced with the result of a necessity for the means and mechanism therefor, and that the size and cost of the apparatus are increased.

Recently, a contact type charging device has been proposed in place of the corona discharger involving these problems. In the contact type charging, a charging member (conductive member) supplied with a voltage is contacted to a member to be charged, by which the surface to be charged is electrically charged to a predetermined polarity and potential. It is advantageous in that the voltage of the power source can be reduced, that the corona products such as ozone are not significant, and that the structure is simple and therefore the cost is low.

There have been proposed as the contact type charging member, a roller type using a roller (Japanese Laid-Open Patent Application No. 91253/1981), a blade type using a blade member (Japanese Laid-Open Patent Application 104349/1981), or charging-cleaning type (Japanese Laid-Open Patent Application No. 165166/1981).

As has been proposed in Japanese Laid-Open Patent Application No. 149669/1988 which has been assigned to the assignee of this application, oscillating voltage, having a peak-to-peak voltage which is not less than twice a charge starting voltage to the member to be charged when only a DC voltage is applied to the contact charging member, is applied between the contact type charging member and the member to be charged, by which the member to be charged is electrically charged or electrically discharged (AC application type), and which is advantageous in that the uniform charging action is possible. The oscillating voltage is a voltage having a periodically changing voltage level. As a problem of a contact charging means of the AC application type, there is a noise (charging noise) attributable to the AC component of the applied charging bias voltage to the contact charging member.

Referring to FIG. 12, the mechanism of the charging noise generation will be described. The member to be charged in the form of a photosensitive drum 1 comprises a conductive base (base plate) 1*b* made of aluminum and electrically grounded, a photosensitive layer 1*a* on the outer surface of the base layer. A charging roller 20 functioning as the contact type charging member is press-contacted to the surface of the photosensitive drum. It includes a stainless core 21 functioning as a support and a charging layer 22 integral with the core metal 21. It is made of EPDM (ethylene propylene diane tarpolymer) in which carbon is dispersed or another solid conductive rubber layer. To the core metal 21, an AC biased DC voltage (oscillating voltage) is applied.

(1) Because of the existence of the AC component of the applied oscillating voltage (Vac+Vdc), positive and negative charges are induced sandwiching the photosensitive layer 1*a* with the positive charge at the charging layer 22 side and the negative charge at the base layer 1*b* side, as shown by a thick solid line (FIG. 12A), in the charging member 20.

(2) Since the positive and negative charges attract each other, the surface of the charging layer 22 is attracted to the photosensitive drum 1 side against the elasticity of the charging layer 22, so that it moves from the thick solid line position to the thin solid line position (the thick solid line position in (FIG. 12B).

With this, the core metal 21 integral with the charging layer 22 moves from thick solid line position H1 away from the surface of the photosensitive drum 1 to a thin solid line position H2 away from the photosensitive drum surface (H2<H1).

(3) When the reverse of the AC electric field starts, the positive charge at the charging layer 22 side and the negative charge at the base layer 1*b* side are attenuated by the induced opposite polarity charges.

When the AC electric field switches from the positive to the negative, the positive charge at the charging layer 22 side and the negative charge at the base layer 1*b* side are neutralized. FIG. 12B shows this state.

(4) As a result, the attraction force toward the photosensitive drum against the elasticity of the charging layer 22, decreases and the surface of the charging layer 22 returns from the thick line position to the thin line position (thick line position in FIG. 12A by the elastic force.

With this, the core metal 21 integral with the charging layer 22 returns from the thick line position H2 to the original position H1.

(5) When the negative side peak of the AC electric field is reached, as shown in FIG. 12C, the negative charge and positive charge are induced at the charging layer 22 side and the base layer 1*b* side, respectively.

Due to the attraction force between the negative and positive charges, the surface of the charging layer 22 is again attracted to the photosensitive drum 1 side against the elasticity of the charging layer 22, so that it moves from the thick line position to the thin line position.

Therefore, the core metal 21 integral with the charging layer 22 is moved from the thick line H1 position to the thin line H2 position, again. In this manner, corresponding to the repeated alternation of the AC electric field, the surface of the charging layer 22 is attracted to the photosensitive drum 1 side against the elasticity of the charging layer 22 and returned due to the release of the attraction force, in a repeated fashion, and a relatively heavy core metal 21 of stainless steel or the like integral with the charging layer 22 moves (H1, H2), and therefore, the entirety of the charging member 20 including the core metal 21 and the charging layer 22 vibrates when the oscillating voltage is applied. The vibration beats the photosensitive drum 1 with the result of relatively high charging noise which is noisy.

When the frequency of the AC voltage is f, and the oscillating frequency of the charging member 20 is F, the charging member 20 vibrates twice in one period of the AC voltage, as will be understood from the foregoing. There is the following relation between the frequencies f and F:

$$2f(Hz)=F(c/s).$$

The generation of the charging noise is not limited to the charging roller type, but the noise is produced in the case of the charging blade or a charging pad or the like through the same mechanism.

As a measure for reducing the charging noise, the peak-to-peak voltage Vpp of the AC component of the oscillating voltage (Vac+Vdc) applied to the contact type charging member 20 is less than twice the charge starting voltage for the charging member. By doing so, the charging noise can be quite reduced.

However, in the contact charging of the AC application type, the reduction of the peak-to-peak voltage Vpp of the AC component means reduction of the uniforming effect of the AC component, and therefore, it becomes not possible to uniformly charge the member to be charged with the result of spot like charging non-uniformity. This is because there is microscopic pits and projections on the surfaces of the member to be charged 1 and the contact surface, and therefore, no ideal contact surfaces are obtainable.

In an electrophotographic image formation process, the non-uniformity spots on the photosensitive drum 1 means black spots on the resultant image, thus deteriorating the image quality.

SUMMARY OF THE INVENTION

Accordingly, it is a principal object of the present invention to provide a charging member, a charging device, a process cartridge and an image forming apparatus in which the charging noise is reduced.

It is another object of the present invention to provide a charging member, a charging device, a process cartridge and an image forming apparatus in which the charging is uniform.

It is a further object of the present invention to provide a process cartridge and an image forming apparatus in which uniform charging is performed, so that the degradation of the image quality is effectively prevented.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The preferred embodiments of the present invention will be described in conjunction with the accompanying drawings.

Figure 11:
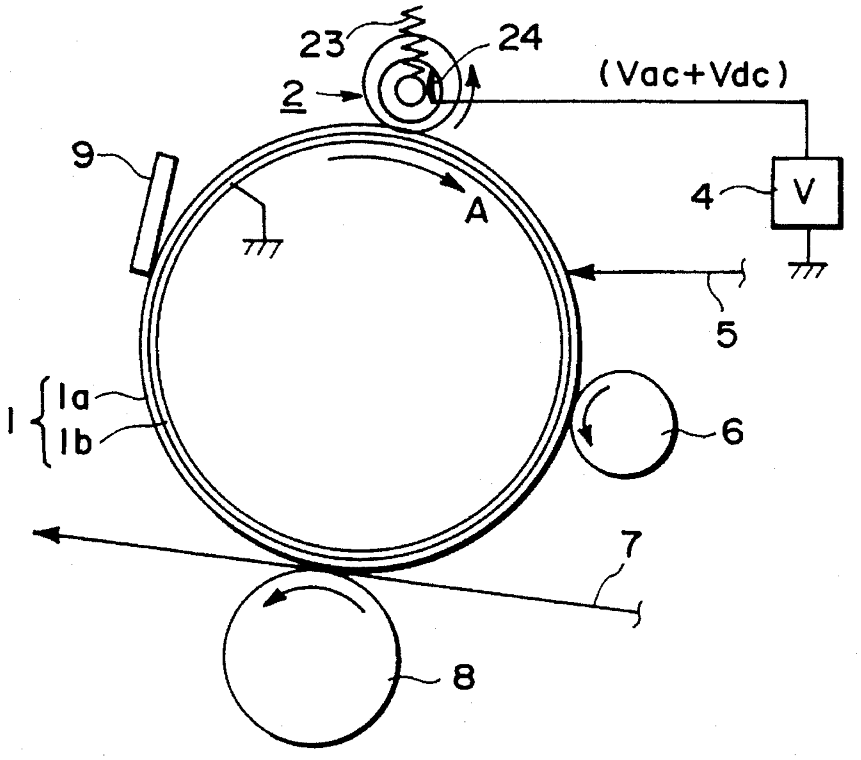
FIG. 11 is a sectional view of an image forming apparatus using the contact type charging device.

Referring first to FIG. 11, there is shown an exemplary image forming apparatus using a contact type charging means as the charging means for an image bearing member.

The image forming apparatus is a laser beam printer using an electrophotographic process.

The image forming apparatus comprises a drum type electrophotographic photosensitive member 1 (photosensitive drum). It is rotated in the clockwise direction (A) at a predetermined peripheral speed (process speed, 40 mm/sec, for example). The photosensitive drum 1 comprises a negatively chargeable organic photoconductive layer 1*a* and a conductive base 1*b* which is electrically grounded.

A charging member (charging roller) 2 is contacted to the photosensitive drum 1. The charging roller 2 is disposed substantially in parallel with the photosensitive drum 1, with a core metal 2*a* thereof supported by bearings (not shown) at the opposite ends, and is urged to the photosensitive drum 1 by a spring 23, so that it is press-contacted to the photosensitive drum 1 surface with a predetermined pressure. In this embodiment, the charging roller 2 is driven by the photosensitive drum 1.

To the charging roller 2, an oscillating voltage in the form of an AC biased DC voltage is applied from a power source 4 through a sliding electrode 24 contacted to the core metal 2*a*. The DC voltage is of the negative polarity. The peak-to-peak voltage of the oscillating voltage is not less than twice a charge starting voltage which is a voltage at which the charging of the photosensitive drum starts when only a DC voltage is applied to the charging member. By the oscillating voltage having such a peak-to-peak voltage, the surface of the photosensitive drum 1 is uniformly charged. The oscillating voltage is a voltage having a periodically changing voltage level. The waveform thereof may be sinusoidal, rectangular, triangular or the like. The oscillating voltage may be provided by periodically rendering on and off a DC voltage source to generate a rectangular waveform.

Then, the charged surface of the rotating photosensitive drum 1 is exposed to a scanning laser beam 5 which is modulated in accordance with a time series electric signal of digital pixels corresponding to an object image or information and which is emitted from an unshown laser scanner, so that the information is written on the photosensitive member as an electrostatic latent image.

The latent image is visualized (developed) into a toner image with a toner charged to negative polarity, by a developing speed of a developing device 6 through reverse development. The toner image is continuously transferred onto a transfer material 7 which has been fed at the predetermined timing from an unshown sheet feeding station into a nip formed between the photosensitive drum and the transfer roller 8.

The transfer material 7 now having the toner image transferred thereonto, is separated from the surface of the photosensitive drum 1, and is conveyed to an unshown image fixing means, where it is subjected to the image fixing operation thereof. It is then discharged as a print.

On the other hand, the surface of the rotating photosensitive drum 1, after the transfer material is separated therefrom, is cleaned by a cleaning blade 9 of a cleaning device so that the residual toner or the like is removed therefrom. Then, the photosensitive meter is repeatedly used for the next image formation.

The description will be made as to a charging member according to a first embodiment of the present invention.

Figure 1:
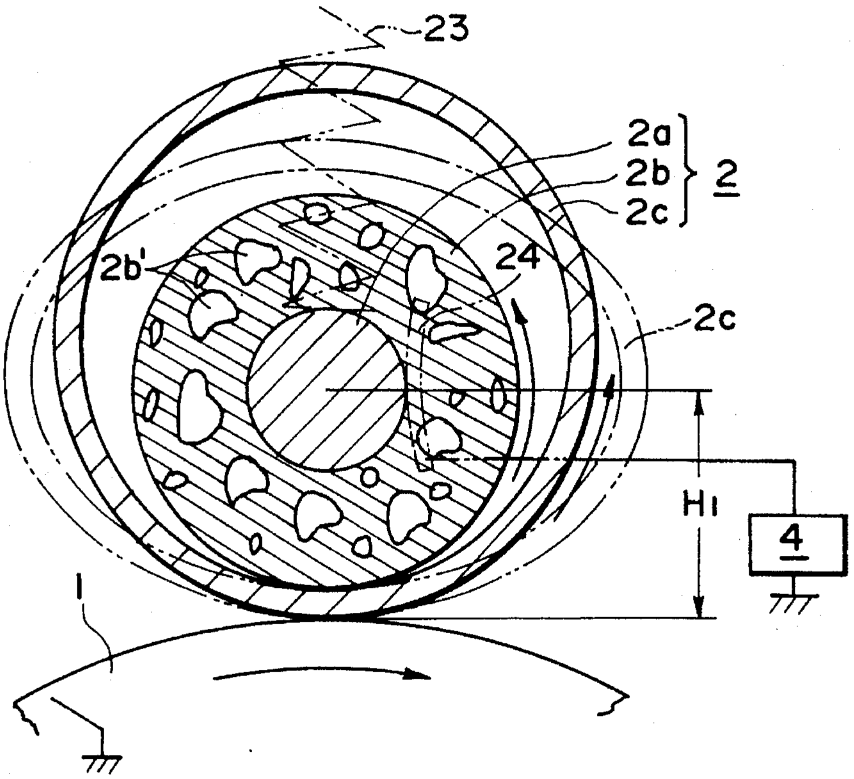
FIG. 1 is a sectional view of a contact type charging member (charging roller) or a contact type charging device according to a first embodiment of the present invention.
Figure 2:
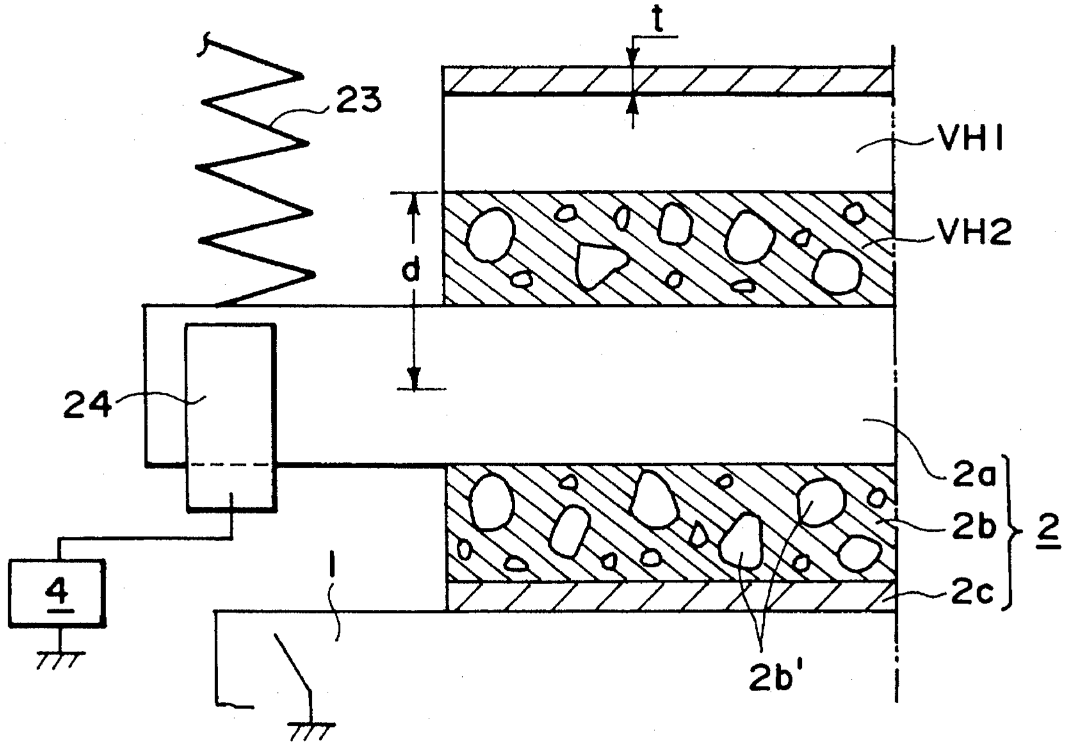
FIG. 2 is a longitudinal sectional view at one side of the device.

Referring now to FIG. 1, there is shown a contact type charging member or a contact type charging device according to a first embodiment of the present invention in cross-section. FIG. 2 is a longitudinal sectional view at an end. The scale of the drawing is not necessarily correct for the purpose of better illustration.

The charging roller 2 comprises an electroconductive metal core 2*a* of stainless steel or the like, an electroconductive foamed layer 2*b* formed on the outer surface of the core metal 2*a* coaxially, and a charging layer 2*c* in the form of a tube loosely fitted to the outer surface of the foamed layer 2*b* without bonding therebetween.

In this embodiment, the core metal 2*a* for supporting the foamed layer 2*b* and an integral roller of conductive foamed layer 2*b* constitute a supporting portion, and the charging layer 2*c* in the form of a tube loosely covering it without bonding constitutes a charging part. The inside diameter of the charging part is larger than the outer diameter of the supporting portion.

The material of the foamed layer 2*b* may be polystyrene, polyolefine, polyester or the like, or EPDM or urethane material in which electroconductive powder such as carbon or tin oxide is dispersed and foamed. It is an elastic or soft material. Designated by 2*b* are pores of the foamed layer 2*b*, which contain air, nitrogen, argon gas or the like. The electroconductivity of the foamed layer 2*b* is not inevitable, but it will suffice if the electric connection is established between the core metal 2*a* to which the voltage is applied and the charging layer 2*c*. Therefore, it may be of insulative material. What is necessary is to permit bias voltage application to the charging layer 2*c*. In this embodiment, the pores are independent, but a material having continuous pores is usable.

The charging layer 2*c* is of electroconductive rubber material such as EPDM or the like in which carbon is dispersed.

The specifications of the charging roller 2 are as follows:

Core metal 2*a*: diameter, 9 mm; length, 332 mm; material, stainless steel rod;

Foamed layer 2*b*: foamed EPDM in which conductive powder is dispersed: layer thickness, 2.3 mm; length, 310 mm;

Charging layer 2*c*: EPDM conductive rubber tube in which carbon is mixed and dispersed; volume resistivity, $10^5$ ohm.cm; layer thickness, 80 microns.

The charging roller 2 is supported by unshown bearing at opposite ends of the core metal 2*a*, and is uni-directionally urged to the photosensitive drum 1 by a spring 23, so that it is press-contacted to the surface of the photosensitive drum 1 with a total pressure of 1000 g.

The charging layer 2*c* is sandwiched between the foamed layer 2*b* and the photosensitive drum 1 by the spring 23 at the nip formed between the charging roller 2 and the photosensitive drum 1, so that it is closely contacted to both of the foamed layer 2*b* and the photosensitive drum.

With rotation of the photosensitive drum 1, the charging roller 2 is driven by the photosensitive drum 1 including the charging layer tube 2*c*. However, the roller 2 may be positively rotated in the forward or backward direction.

The charging roller 2 is supplied from the power source 4 through the sliding electrode 24 contacted to the core metal 2*a* of the charging roller with an oscillating voltage in the form of a combination of the following voltages:

AC voltage Vac: 2.0 KVpp, 600 Hz;

DC voltage Vdc: the voltage to which the photosensitive member is charged (−700 V).

The voltage is applied to the charging layer 2*c* through the core metal 2*a* and the conductive foamed layer 2*b*, and most of the electric charge is transferred in the nip between the charging roller 2 and the photosensitive member 1, so that the peripheral surface of the rotating photosensitive drum 1 is uniformly charged to the target potential.

(1) The charging layer 2*c* (charging portion) vibrates as shown by the solid line and chain line in FIG. 1 through the mechanism described in the foregoing due to the AC component of the applied oscillating voltage. However, since the charging layer 2*c* is not bonded and therefore independently movable from the foamed layer 2*b* (supporting portion), only the charging layer 2*c* vibrates, without vibration of the core metal and the integral foamed layer 2*b*. The distance H1 between the core metal and the surface of the photosensitive drum 1 is maintained substantially constant.

In other words, the heavy core metal 2*a* or the supporting portions 2*a* and 2*b* containing the core metal do not substantially vibrate, and therefore, the vibration occurs only in the charging layer 2*c* which is a light charging portion, and therefore, the energy (mass) beating the photosensitive drum 1 (the member to be charged) by the charging roller 2 (charging member) is reduced, by which the generated charging noise is reduced to such an extent as to pose no problem.

The contact type charging device was placed in an anechoic chamber, and the charging noise was measured. The measurement was carried out under 7779 section 6. As a result, the charging noise was lower than the conventional solid ones by 15–20 dB. When it was set in an image forming apparatus, it was confirmed that the contact type charging device could uniformly charge the surface of the photosensitive member 1 without an improperly charged portion, and therefore, good images could be formed.

Figure 12A:
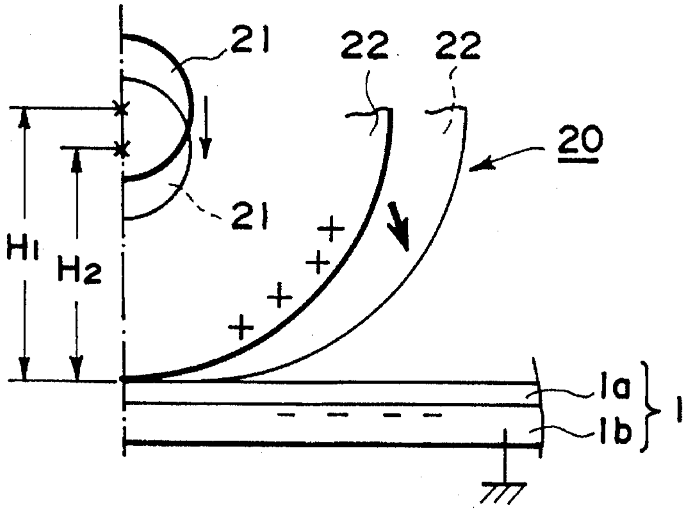
FIGS. 12A, 12B and 12C illustrate the mechanism of the charging noise generation.
Figure 12B:
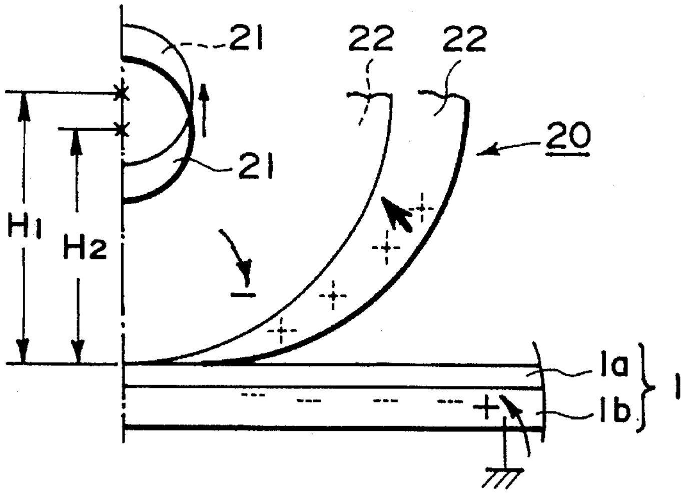
Figure 12C:
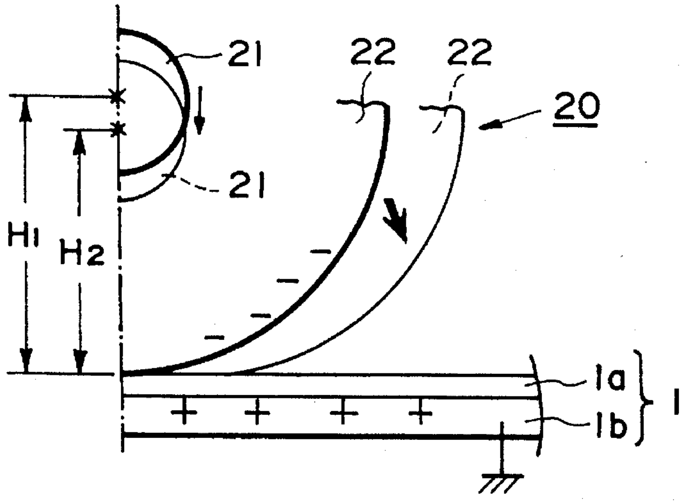

For the purpose of comparison, a conventional solid integral charging roller 20 as shown in FIG. 12 was prepared with the following specifications:

Core metal 21: diameter, 9 mm; length, 332 mm; material, stainless steel rod;

Charging layer 22: solid EPDM conductive rubber in which carbon is mixed and dispersed; volume resistivity, $10^5$ ohm.cm; layer thickness, 2.5 mm; length, 310 mm; weight of the charging roller 20, 185 g.

The generated charging noise was 57 dB.

(2) The reduction of the charging noise permits increasing the AC component frequency of the oscillating voltage applied to the contact type charging member. By increasing the frequency, the moire which is the problem with the low frequency, that is, the interference fringe appearing on the image due to the interference between the scanning layer beam and the AC component frequency, can be avoided.

(3) The force with which the charging roller 2 beats the photosensitive drum 1 is reduced, and therefore, the toner fusing resulting from the toner not removed from the photosensitive member being urged to the drum, can be suppressed.

Figure 3:
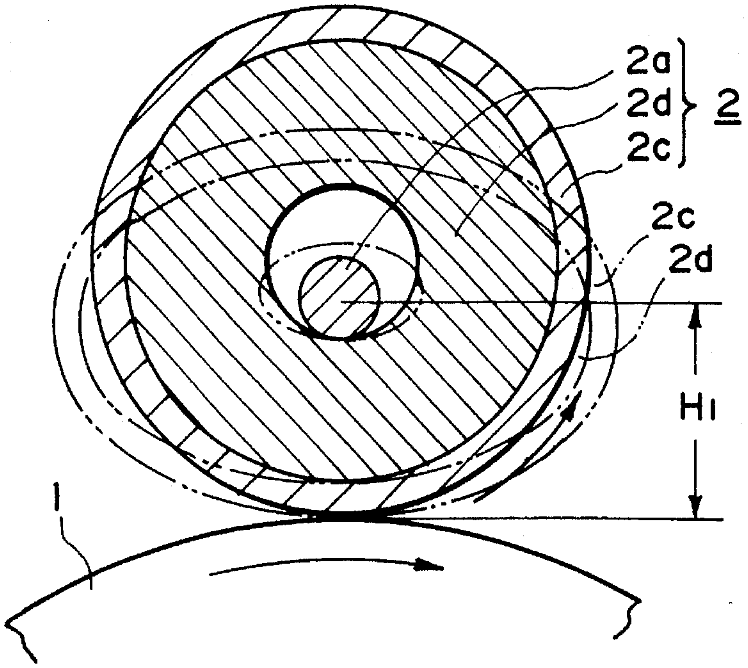
FIG. 3 is a sectional view of a contact type charging member (charging roller) or a contact type charging device according to a second embodiment of the present invention.
Figure 4:
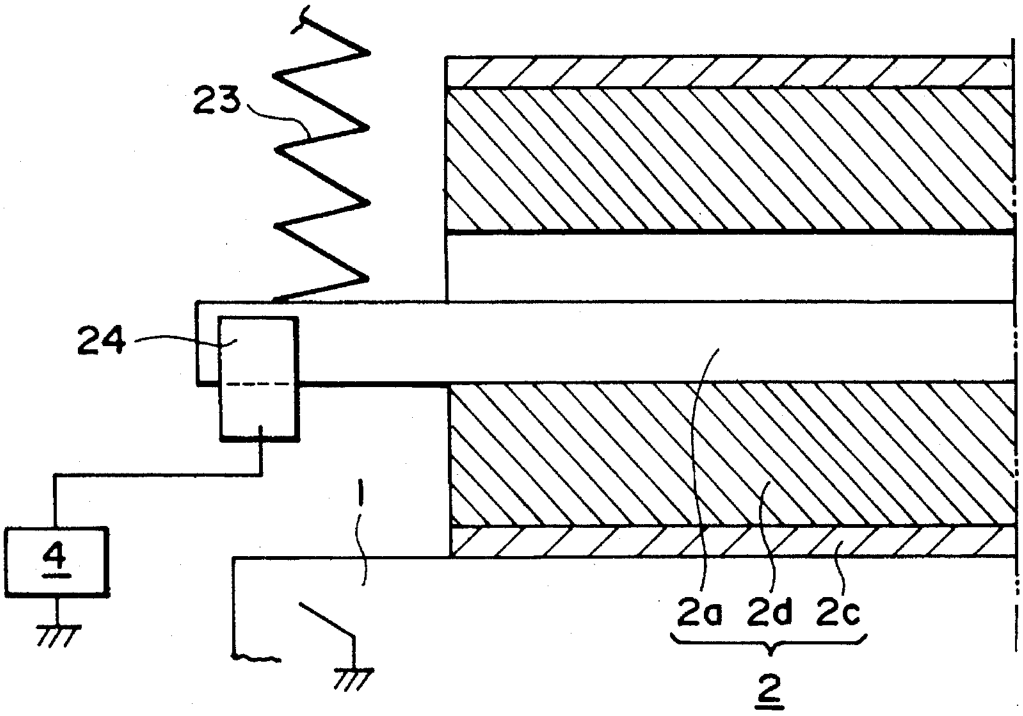
FIG. 4 is a longitudinal sectional view at an end of the device.

Referring to FIGS. 3 and 4, a charging member according to a second embodiment will be described. The charging roller 2 of this embodiment comprises a conductive elastic layer 2*d* in the form of a thick cylinder, a charging layer 2*c* integrally coated on the outer peripheral surface of the conductive elastic layer 2*d*, and a core metal 2*a* loosely fitted in the conductive elastic layer 2*d*. In this embodiment, the core metal 2*a* functions as a supporting portion, and the conductive elastic layer 2*d* loosely mounted thereon and the charging layer 2*c* thereon, function as the charging part. That is, the inside diameter of the charging part is larger than the outside diameter of the supporting part.

The specifications of the charging roller 2 are as follows:

Core metal 2*a*: diameter, 9 mm; length, 332 mm; material, stainless steel rod;

Conductive elastic layer 2*d*: solid silicone rubber in which carbon is mixed and dispersed; inside diameter, 9.5 mm; outside diameter, 16 mm; length, 310 mm; volume resistivity, $10^5$ ohm.cm;

Charging layer 2*c*: EPDM conductive rubber layer in which carbon is mixed and dispersed volume resistivity, $10^5$ ohm.cm; layer thickness, 80 microns.

The charging roller 2, similarly to the charging roller in in FIG. 1 embodiment, is supported by bearings not shown at the opposite ends of the core metal 2*a*, and is urged to the photosensitive drum 1 by a spring 23, so that it is press-contacted to the surface of the photosensitive drum 1 with a total pressure of 1400 g.

In the nip between the charging roller 2 and the photosenstive drum 1, the urging force of the spring 23 brings the charging layer 2*c* into close contact to the surface of the photosensitive drum 1, so that the core metal 2*a* is closely contacted to the inside surface of the conductive elastic layer 2*d*. The charging roller 2, including the loosely supported conductive elastic layer 2*d* and the charging layer 2*c* and the core metal 2*a*, is driven by the photosensitive drum 1.

The charging roller 2 is supplied from a voltage source 4 with a superposed oscillating voltage (Vac+Vdc) similarly to the first embodiment through a gliding electrode 24 contacted to the core metal 2*a* of the charging roller. The voltage is applied to the charging layer 2 through the core metal 2*a* and the conductive elastic layer 2*d*, by which the peripheral surface of the rotating photosensitive drum 1 is uniformly charged to a target potential through an AC application and contact type charging process.

The conductive elastic layer 2*d* and the charging layer 2*c* (charging part) is vibrated as indicated by the solid line and the chain line in FIG. 3 through the above-described mechanism due to the AC component of the applied oscillating voltage. However, since the charging part 2*d* and 2*c* is not bonded, and therefore, is free independently from the supporting part, that is, the core metal 2*a*, only the charging part comprising the conductive elastic layer 2*d* and the charging layer 2*c*, is vibrated, but the core metal 2*a* (supporting part) does not substantially vibrate. Therefore, the distance H1 between the core metal 2*a* and the surface of the photosensitive drum 1 is maintained constant.

In other words, the heavy supporting portion (core metal 2*a*) does not vibrate substantially, and the vibration occurs only in the conductive elastic layer 2*d* and the charging layer 2*c* which has light weight. Therefore, the energy (mass) beating the photosensitive drum 1 (the member to be charged) by the charging roller 2 (charging member) is reduced, by which the charging noise is reduced to the level of no problem.

The contact type charging device was placed in an anechoic chamber, and the charging noise was measured. The measurement was carried out under ISO 7779, section 6.

As a result, the charging noise was lower than the conventional solid ones by 15–20 dB. When it was set in an image forming apparatus, it was confirmed that the contact type charging device could uniformly charge the surface of the photosensitive member 1 without an improperly charged portion, and therefore, good images could be formed.

The conductive elastic layer 2*d* is not inevitably of electroconductive nature. What is necessary is that the electric connection is established between the conductive core metal and the charging layer 2*c*. It may be of insulating material, if the bias voltage can be applied externally to the charging layer 2*c*.

Figure 5:
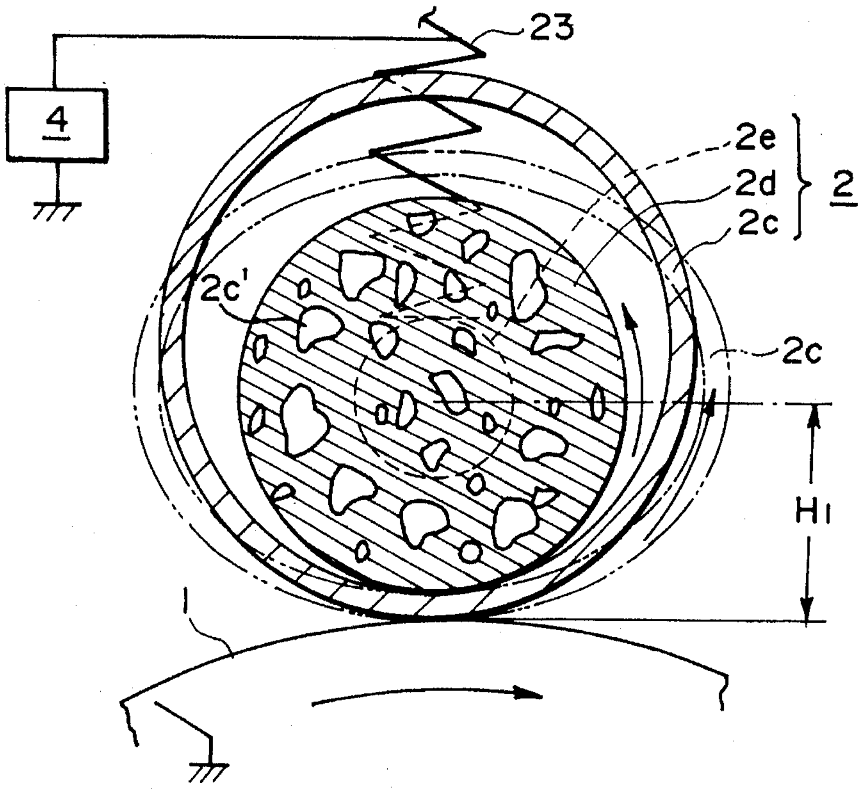
FIG. 5 is a sectional view of a contact type charging member (charging roller) or a contact type charging device according to a third embodiment of the present invention.
Figure 6:
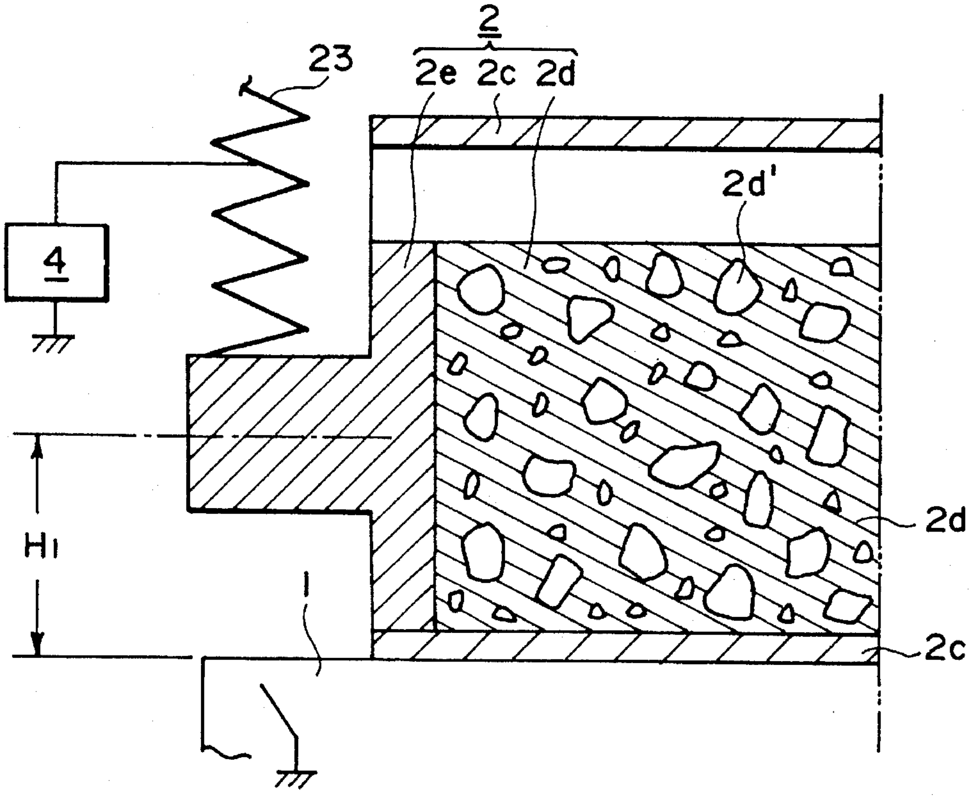
FIG. 6 is a longitudinal sectional view at an end of the device.

Referring to FIGS. 5 and 6, a charging member according to a third embodiment of the present invention will be described. The charging roller 2 of this embodiment comprises a conductive elastic layer 2*d* in the form of a roller, a metal flange 2*e* with shaft integrally mounted to each of the longitudinal end surfaces of the elastic layer 2*d*, a charging layer 2*c* in the form of a tube loosely mounted, without bonding, on the outer peripheral surface of the electroconductive elastic layer roller 2*d* having the metal flange 2*e*. In this embodiment, the elastic layer 2*d* is of foamed material, and designated by a reference 2*d'* are pores of the foamed material.

In this embodiment, the supporting part is constituted by the elastic layer roller 2*d* with the metal flange 2*e*, and the charging layer tube 2*c* is the charging part. Thus, the inside diameter of the charging part is larger than the outside diameter of the supporting part.

The specifications of the charging roller 2 in this embodiment are as follows:

Conductive elastic layer 2*d*: foamed styrol material in which carbon is mixed and dispersed; outer diameter, 14 mm; length, 310 mm; volume resistivity, $10^5$ ohm.cm; and Charging layer 2*c*: EPDM conductive rubber layer in which carbon is mixed and dispersed; volume resistivity, $10^5$ ohm.cm: layer thickness, 80 microns.

The charging roller 2 is supported by unshown bearings at shaft portions of the flanges 2*e*, and is urged to the photosensitive drum 1 by a spring 23, so that it is press-contacted to the photosensitive member with a predetermined pressure, 1400g in total pressure in this embodiment.

The charging layer 2*c* in the form of a tube is sandwiched between the elastic layer 2*d* and the photosensitive drum 1 by the spring 23 in the nip formed between the charging roller 2 and the photosensitive drum 1, so that they are maintained in close contact. The charging roller 2 including the charging layer tube 2*c*, is driven by the photosensitive drum 1.

To the charging roller 2, an oscillating voltage (Vac+Vdc) similarly as in the embodiment 1, is applied from the voltage source 4 through the pressure spring 23 and the metal flange 2*e*. The applied bias voltage is supplied to the charging layer 2*c* in electric connection with the elastic layer 2*d* and the metal flange 2*e*, so that the surface of the rotating photosensitive drum 1 is uniformly charged to the target temperature through the AC application contact process.

In this embodiment, similarly to the first embodiment, the charging layer 2*c* (charging part) is vibrated as indicated by the solid line and the chain line in FIG. 5 through the same mechanism due to the AC component of the applied oscillating voltage. However, the charging layer 2*c* is not bonded to the elastic layer 2*d* (supporting part) and therefore is independent, so that only the charging layer 2*c* vibrates. The conductive elastic layer 2*d* with the flange 2*e* (supporting part) does not substantially vibrate, by which the distance H1 between the shaft portion of the flange 2*e* and the surface of the photosensitive drum 1 is maintained substantially constant.

In other words, the elastic layer 2*d* having the flange 2*e* (supporting part) does not vibrate substantially, and the vibrating motion occurs only in the charging layer 2*c* which is a light weight charging part. Therefore, the energy (mass) beating the photosensitive drum (the member to be charged) by the charging roller 2 (the charging member), is reduced, so that the produced charging noise is reduced to the level of no problem.

The contact type charging device was placed in an anechoic chamber, and the charging noise was measured. As a result, the charging noise was lower than the conventional solid ones by 15–20 dB.

The charging roller 2 of this embodiment does not have a heavy core metal 2*a* penetrating through the entire length of the roller as in the first embodiment, and therefore, the total weight of the charging roller is small. This is effective to reduce the cost, and also effective to suppress the toner fusing. When it was set in an image forming apparatus, it was confirmed that the contact type charging device could uniformly charge the surface of the photosensitive member 1 without an improperly charged portion, and therefore, good images could be formed.

Figure 7:
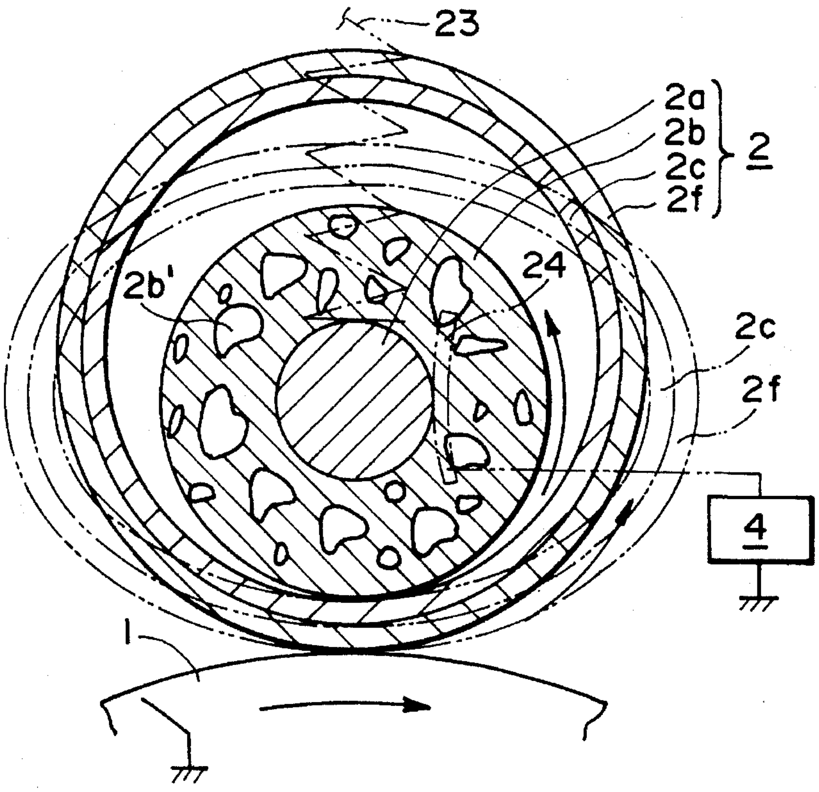
FIG. 7 is a sectional view of a contact type charging member (charging roller) or a contact type charging device according to a fourth embodiment of the present invention.
Figure 8:
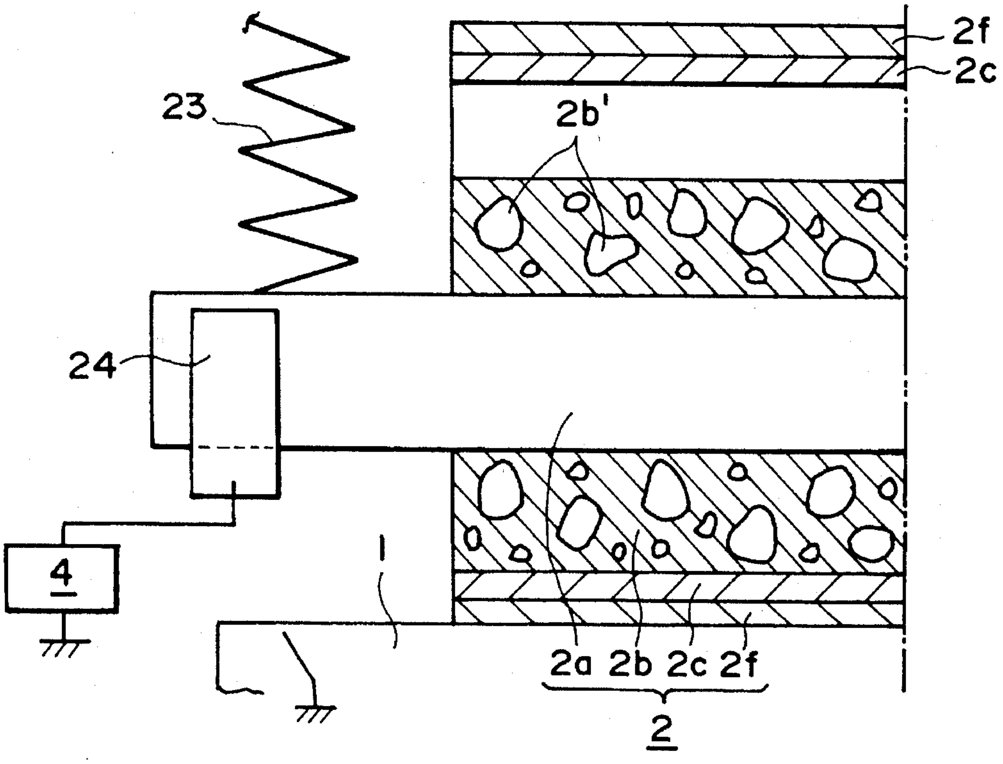
FIG. 8 is a sectional view at an end of the apparatus.

Referring to FIGS. 7 and 8, a fourth embodiment of the charging member will be described. This charging member is a modification of the first embodiment. In this embodiment, the charging roller 2 is provided with a high resistance layer 2*f* on the outer periphery of the charging layer 2*c*, the high resistance layer 2*f* being made of epichlorohydrin rubber, paper or the like having a volume resistivity higher than that of the charging layer 2*c*.

The high resistance layer 2*f* in this embodiment is made from epichlorohydrin rubber having a layer thickness of 80 microns and a volume resistivity of $10^{10}$ ohm.cm.

The high resistance layer 2*f* functions, when the charging roller is contacted to a defect such as pin hole or the like on the photosensitive drum having a low durable voltage, to prevent abnormal discharging by the leakage of the current concentrated through the pin hole or the like. The charging roller of this embodiment produces low charging noise, as in the first embodiment. In addition, the charging operation is proper even if the photosensitive drum 1 is provided with a pin hole or another defect.

The outer surface of the high resistance layer 2*f* may be coated with seepage preventing layer (such as nylon or Toresin) to prevent the plasticizer from seeping out of the charging roller. The non-contact portion is not limited to between the core metal 2*a* and the foamed layer 2*b*, but it may be between the foamed layer 2*b* and the charging layer 2*c*, or between the charging layer 2*c* and the high resistance layer 2*f*.

Figure 9:
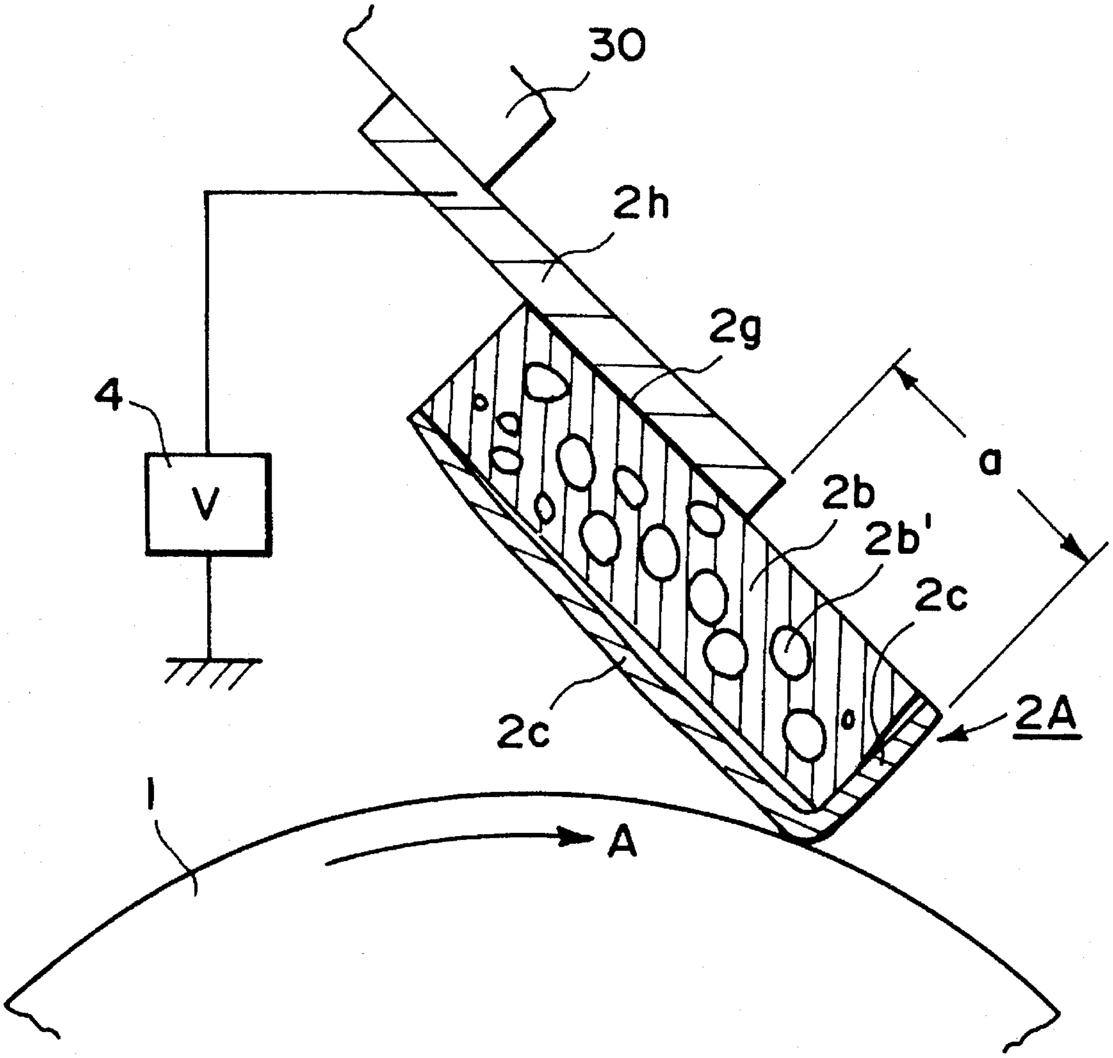
FIG. 9 is a sectional view of a contact type charging device (charging blade) or a contact type charging device according to fifth embodiment of the present invention.

Referring to FIG. 9, a charging member according to a fifth embodiment of the present invention will he described. In this embodiment, the contact type charging member is in the form of a blade (charging blade). FIG. 9 is a sectional view of the charging device using the charging blade 2A. The Charging device using the charging blade 2A is simpler in the structure than the charging roller.

The charging blade 2A comprises an elastic foamed layer 2*b* in the form of a blade made of foamed material such as polystyrene, polyolefine or polyester material or EPDM or urethane material in which conductive powder such as carbon or tin oxide or the like is dispersed, a charging layer 2*c* loosely covering the elastic foamed layer with only the edge bonded to the elastic foamed layer 2*b*, and an electrode plate 2*h* supporting through electro-conductive bonding material 2*g*.

In this embodiment, the supporting part is constituted by the elastic foamed layer 2*b* and the electrode plate 2*h*, and the charging layer 2*c* constitutes the charging part. The edge of the charging blade 2*a* is press-contacted with proper pressure to the surface of the photosensitive drum 1 against the rigidity of the blade, and the electrode plate 2*g* is fixed on a fixed member 30. The charging blade 2A is mounted in this manner.

To the charging blade 2A, an oscillating voltage (Vac+Vdc) is applied from the voltage source 4 through the electrode plate 2*g*, and the surface of the rotating photosensitive drum 1 is uniformly charged through AC contact process.

The charging blade 2A of this embodiment is vibrated through the above-described mechanism due the AC component of the applied oscillating voltage. However, since the charging layer 2*c* is not bonded to but is independent from the elastic layer 2*b* and the part integral therewith, and therefore, only the charging layer 2*c* vibrates, but the elastic foamed layer 2*b* and the electrode plate 2*h* (supporting part) does not substantially vibrate, and therefore, the produced charging noise is of low level.

In this embodiment, the produced charging noise using the following specifications was lower than 10–15 dB than a conventional solid charging roller (applied oscillating voltage is similar to the first embodiment):

Elastic foamed layer 2*b*: EPDM foamed material in which conductive powder is dispersed; depth, 10 mm; length, 310 mm: thickness, 3 mm;

Charging layer 2*c*: EPDM conductive rubber layer in which carbon is mixed and dispersed; volume resistivity, $10^{10}$ ohm.cm; layer thickness, 80 microns;

Free length of the charging blade 2A: 0.5 mm; and

Total pressure to the photosensitive drum 1: 700 g.

Figure 10:
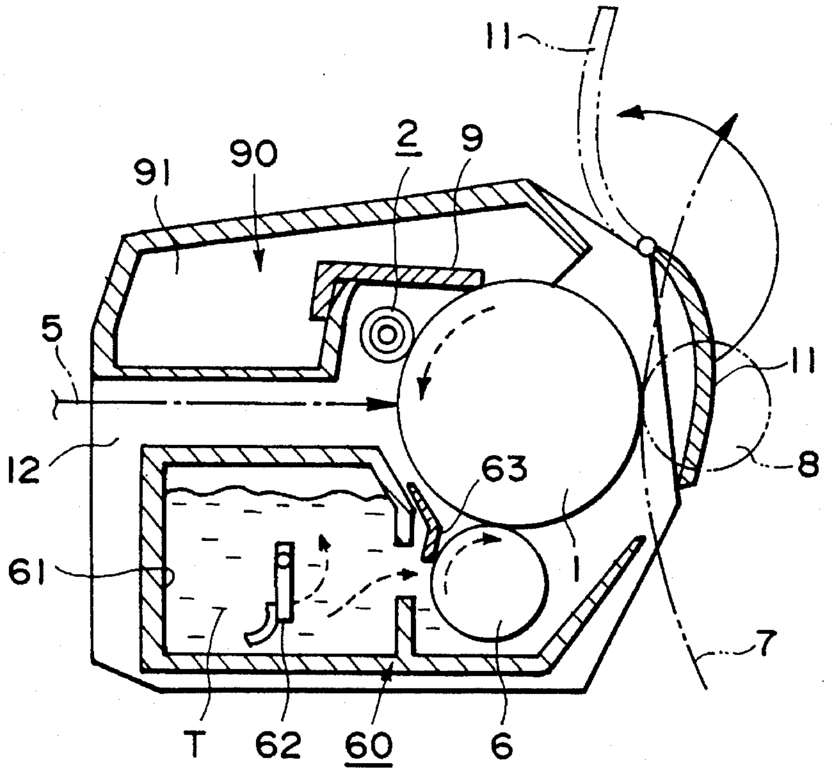
FIG. 10 is a sectional view of a process cartridge according to a sixth embodiment of the present invention.

Therefore, the charging noise can be reduced in the charging blade 2A, too. The charging blade is advantageous in that the pressure of the charging blade 2A to the photosensitive drum can be controlled utilizing the rigidity of the blade material. FIG. 10 shows an example of a process cartridge incorporating the charging member. In this embodiment, the process cartridge is for an image forming apparatus usable with the contact type charging member to charge an image bearing member of the image forming apparatus.

The process cartridge of this embodiment includes an electrophotographic photosensitive drum 1 (image bearing member), a charging roller 2 (charging member), a developing device 60 and a cleaning device 90 (four process means). The process cartridge may contain at least the image bearing member and the charging member.

The charging roller has a structure as described in conjunction with embodiment 1, 2, 3 or 4.

The developing device 60 includes a developing sleeve 6, a developer (toner) T container 61, a toner stirring rod in the container 61. The stirring rod is effective to stir the toner T and to feed the toner toward the developing sleeve. It also comprises a developing blade 63 for applying the toner T on the developing sleeve 6 in a uniform thickness.

The cleaning device 90 comprises a cleaning blade 9, and a toner container 91 for containing the toner removed by the cleaning blade 9.

The process cartridge is provided with a drum shutter 11 which is movable between a closed position indicated by the solid line and an open position indicated by the chain line. When the process cartridge is taken out of the image forming apparatus main assembly (not shown), the drum shutter is in the closed position to cover the photosensitive drum 1 to protect the surface of the photosensitive drum which otherwise is exposed.

When the process cartridge is to be mounted to the main assembly of the image forming apparatus, the shutter 11 is opened (chain line position), or in the process of the mounting of the process cartridge, the shutter 11 is automatically opened. When the process cartridge is mounted in place, the exposed part of the surface of the photosensitive drum 1 is press-contacted to a transfer roller 8 in the main assembly of the image forming apparatus.

The process cartridge and the main assembly of the image forming apparatus are mechanically and electrically coupled with each other, and a driving mechanism in the main assembly of the image forming apparatus becomes capable of driving the photosensitive drum 1, the developing sleeve 6 and the stirring rod 62 or the like in the process cartridge. The electric circuit in the main assembly is capable of supplying a charging bias to the charging roller 2, and the developing bias to the developing sleeve 6, in the process cartridge, thus permitting the image forming operation.

An exposure slit 12 is formed in the process cartridge between the cleaning device 90 and the developing device 60. Through the slit, a laser beam 5 from an unshown laser scanner in the main assembly of the image forming apparatus is projected into the process cartridge, more particularly, onto the rotating surface of the photosensitive drum, thus scanning the photosensitive drum.

Since the charging roller 2 hardly generates the charging noise even if the oscillating voltage is applied, a very compact process cartridge substantially without the charging noise, can be provided.

A preferable thickness of the charging part of the charging member in the first embodiment (FIGS. 1 and 2) will be described.

Figure 13:
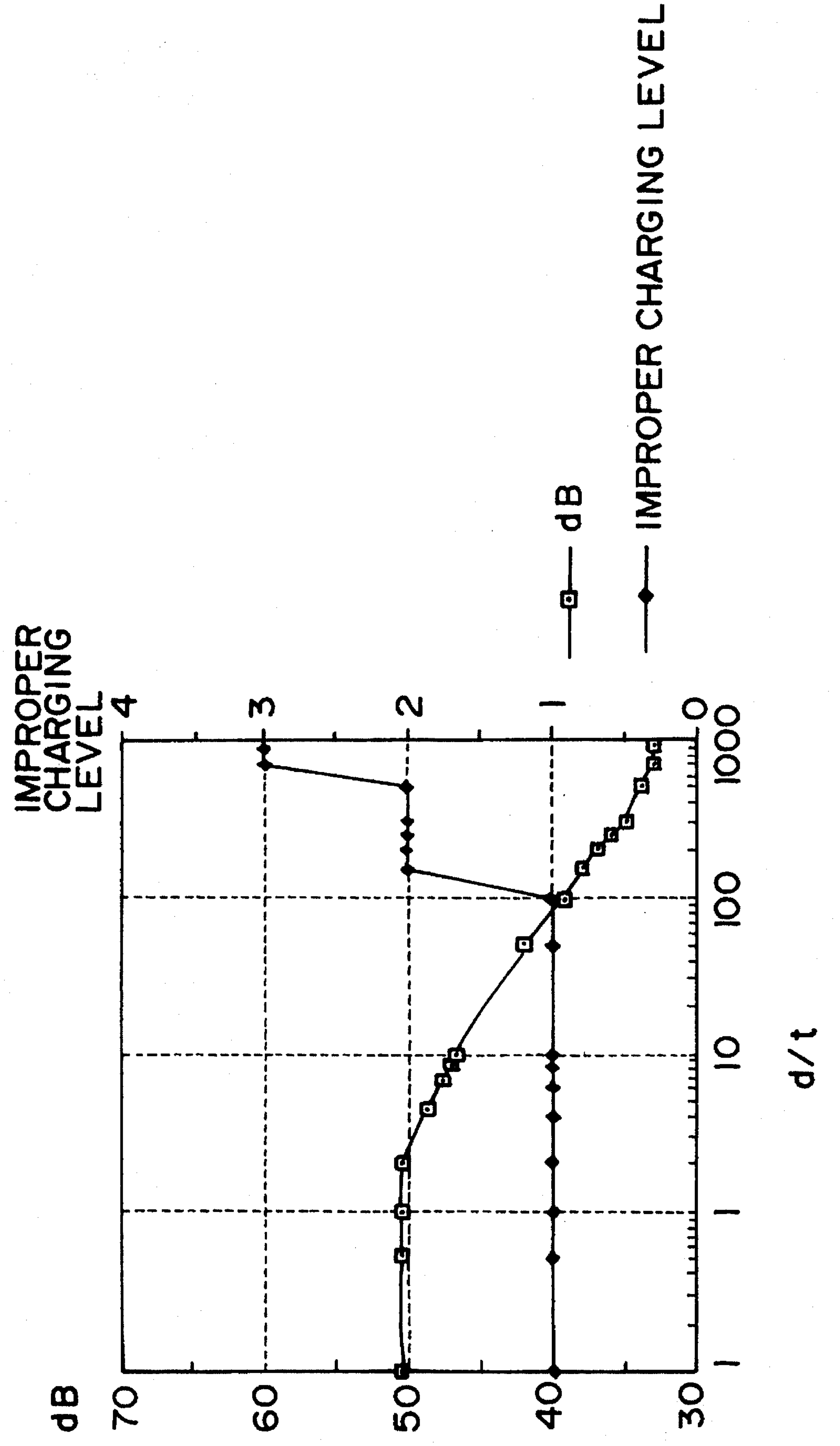
FIG. 13 is a graph showing a relationship between d/t and the charging noise or improper charging level.

In FIG. 2, the thickness of the charging part contacted to the photosensitive drum 1 is t, and the distance between the surface of the elastic layer 2*b* integral with the core metal 2*a* (the surface of the supporting part) and the rotational axis of the charging member is d. FIG. 13 shows a relation between the charging noise and the improper charging with the parameter of the thickness ratio d/t. In this Figure, the abscissa represents the thickness ratio d/t, and the left ordinate represent the charging noise, and the right ordinate represents the degree of the improper charging. Rank 1 means the best, and rank 4 means the worst degree of the improper charging. The rank 1 means that not more than 5 black spots having a diameter not more than 0.5 mm appear, when an A4 size image is formed on the transfer material. Rank 2 means there are more than 5 and not more than 10 such spots; rank 3 means more than 10 and not more than 15 spots; and rank 4 means more than 15 spots. The charging noise was measured under ISO 7779, section 6. As a result, when d is 5.3 mm, and t is 0.080 mm (d/t is 66.3), the charging noise is 42 dB. The other conditions are as follows:

Frequency of the primary charging voltage f=400 Hz;

Peak-to-peak voltage of the primary charging voltage=2.0 kV;

Asker-C hardness K of the charging roller=45 degrees; and

Porosity VH/VT (this will be described hereinafter)=0.42.

When the thickness ratio d/t is further changed with this condition, the charging noise exceeds 50 dB when the thickness ratio d/t is not more than 2. It is practically not a problem, but, it is quite noisy. If the thickness ratio d/t is larger than 10, the charging noise becomes lower than 47 dB, which is no problem. When the thickness ratio d/t is within 20 . 500, the thickness of the charging layer 2*c* is small, and therefore, when an alternating bias voltage is applied, it is too easily vibrated, so that the distance between the charging roller and the photosensitive drum is not maintained constant. The charging level is not satisfactory in this case, and the improper charging rank is 2. Practically, this level is not a problem, but if the thickness ratio d/t exceeds 500, the improper charging rank becomes 3, which is a problem. Therefore, the preferable range of the thickness ratio d/t is as follows from the standpoint of the charging noise and the improper charging:

$$2<d/t<500,$$

further preferably, 10<d/t<200.

Figure 14A:
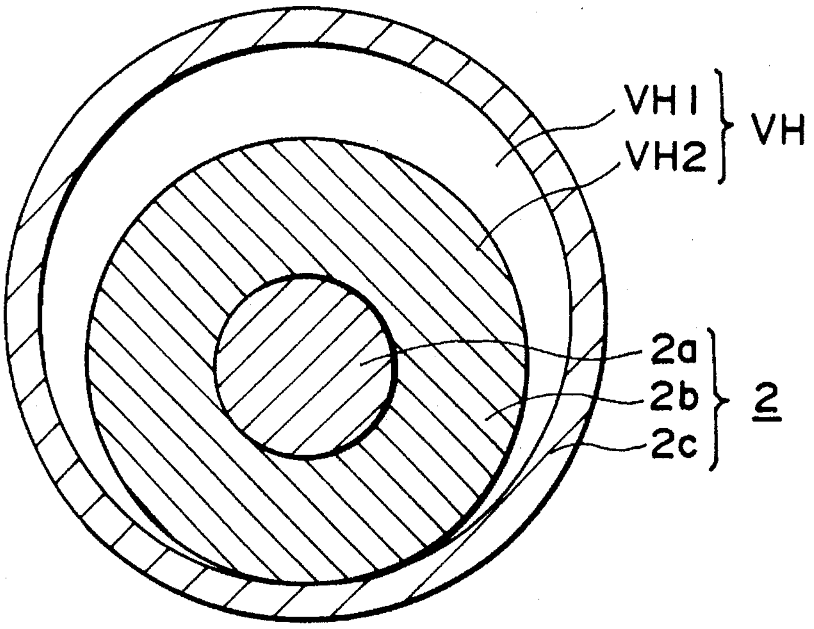
FIG. 14 is sectional and front views of a charging member.

Next, the preferable porosity of the charging member will be described. In FIG. 14A, VH1 is a volume of a gap between the foamed layer 2*b* and the charging layer 2*c*, and VH2 is the entire volume of the cavity in the foamed layer 2*b*. Therefore, the total cavity in the charging member is as follows:

$$VH=VH1+VH2.$$

Figure 14B:
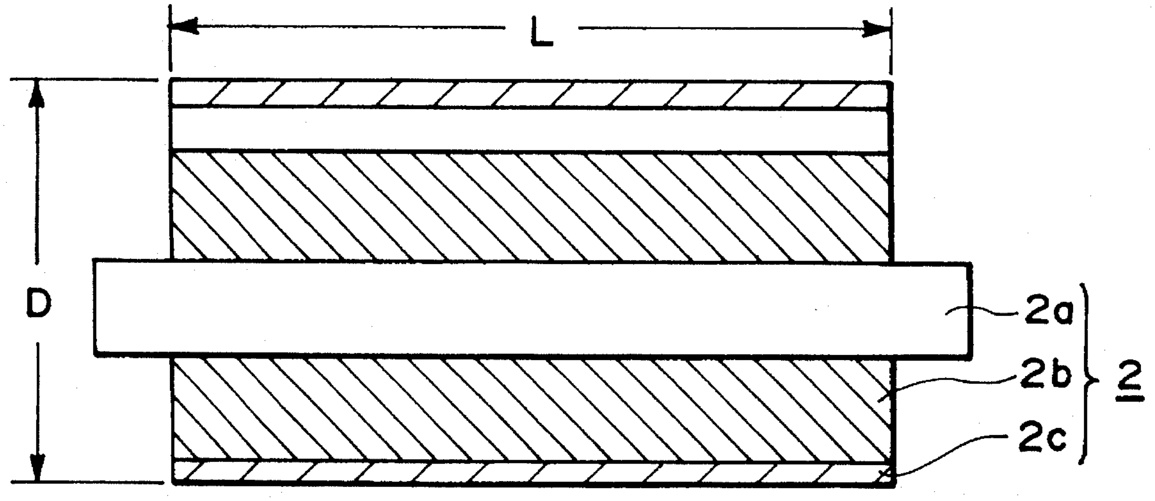

In FIG. 14B, L is a length of the charging part of the charging roller, and D is a diameter. If the charging part of the charging roller has a volume VT, $$VT=\pi(\tfrac{1}{2}\times D)^2\times L.$$

Further, if the porosity is defined as VH/VT, the porosity is expressed as follows:

$$VH/VT=(VH1+VH2)/[\pi(\tfrac{1}{2}\times D)^2\times L].$$

Figure 15:
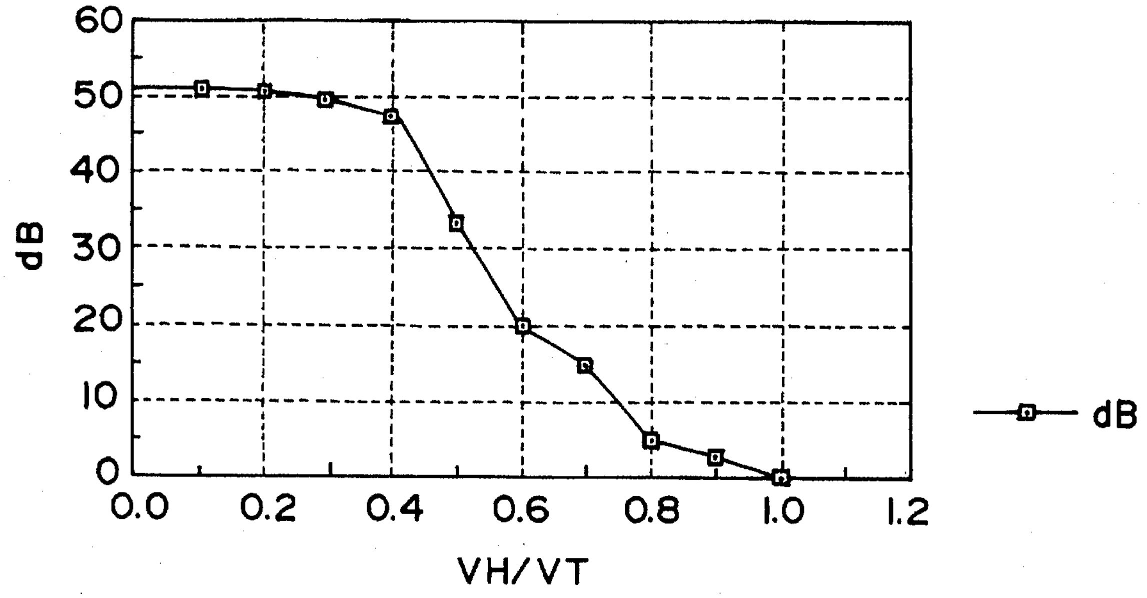
FIG. 15 is a graph of a relation between a porosity and the charging noise.

The charging noise was measured with the porosity VH/VT changed. The measured charging noise is shown in FIG. 15. In this Figure, the ordinate represents the charging noise, and the abscissa represents the porosity VH/VT. The measurement of the noise was under ISO 7779, section 6. The other conditions were as follows:

Primary charging voltage frequency f=400 Hz;

Peak-to-peak voltage of the primary voltage=2.0 KV;

Asker-C hardness K of the charging roller=45 degrees; and

Thickness ratio d/t=66.3.

As a result, if the porosity VH/VT is not more than 0.3, the charging noise exceeds 50 dB. This is practically not a problem, but it is quite noisy. If the porosity VH/VT is larger than 0.4, the charging noise is less than 47 dB, which is no problem. Therefore, from the standpoint of the charging noise, the porosity VH/VT satisfy the following:

$$VH/VT>0.3,$$

further preferably, VH/VT>0.4.

Then, the description will be made as to the preferable range of the frequency of the oscillating voltage applied to the charging member.

Figure 16:
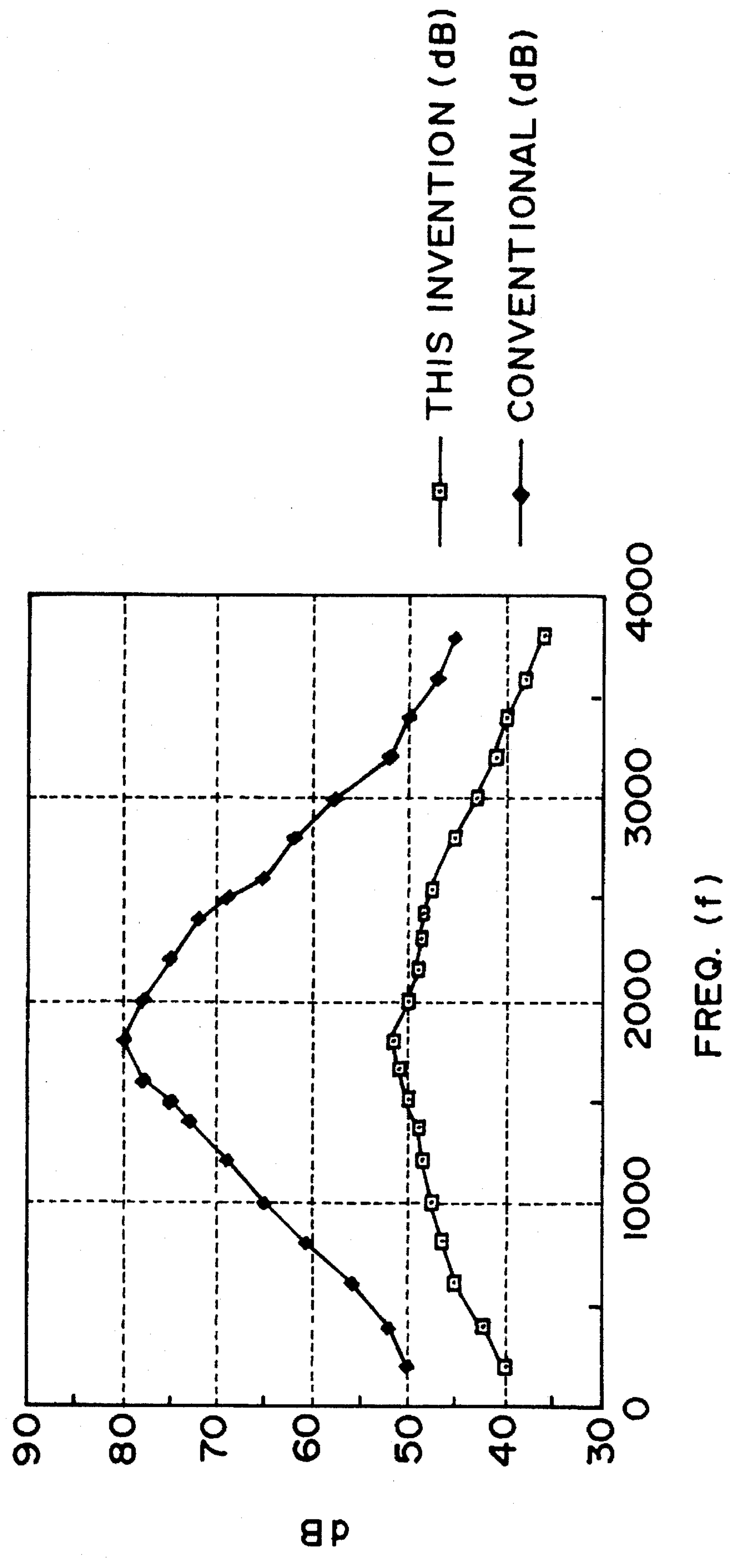
FIG. 16 is a graph of a relation between a charging frequency and a charging noise.

FIG. 16 is a graph of the charging noise in comparison with the conventional solid charging roller, when the primary voltage source frequency f is changed. The measurement was under ISO 7779, section 6. The other conditions were as follows:

Peak-to-peak voltage of the primary voltage source=2.0 KV;

Asker-C hardness K of the charging roller=45 degrees;

Thickness ratio d/t=66.3; and

Porosity VH/VT=0.42.

The primary voltage source frequency f was changed under the above conditions. If the frequency f is not less than 1500 Hz and not more than 500 Hz, the charging noise exceeds 50 dB. This is practically no problem, but it is quite noisy. If the frequency f is smaller than 100 Hz or larger than 2500 Hz, the charging noise is less than 47 dB in this embodiment, while it exceeds 60 dB in the worst case in the conventional example. The charging noise level of this embodiment is no problem. Therefore, from the standpoint of the charging noise, the preferable range of the primary voltage source frequency f is as follows:

$$f<1500 \text{ Hz, or } f>2000 \text{ Hz},$$

further preferably, f<1000 Hz, or f>2500 Hz.

Figure 17:
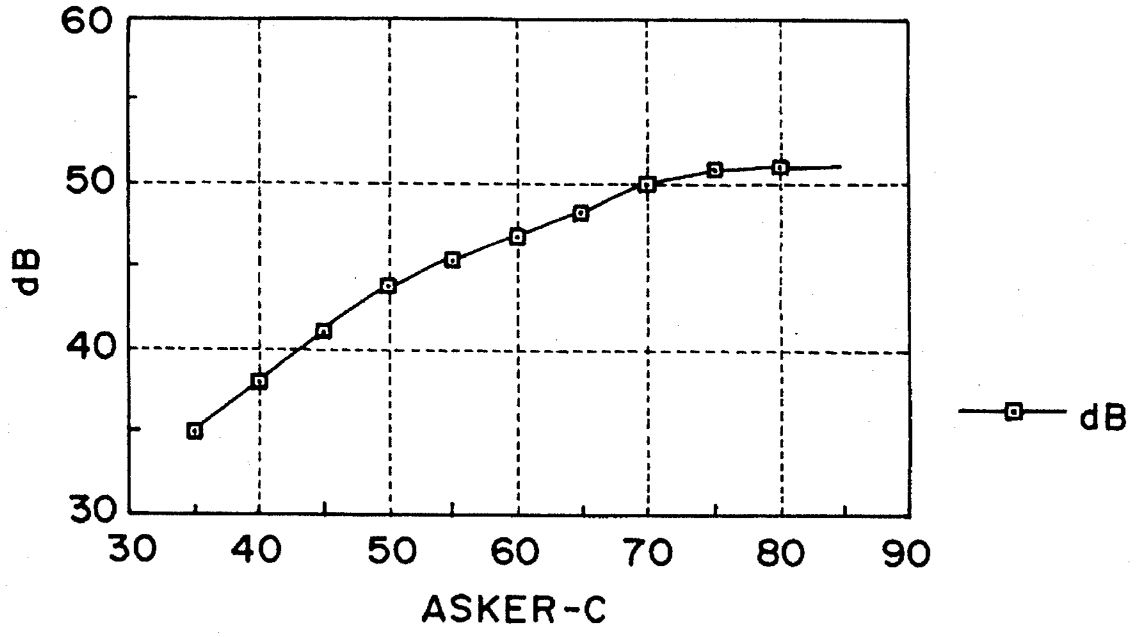
FIG. 17 is a graph of a relation between a hardness and the charging noise of a charging member.
Figure 18:
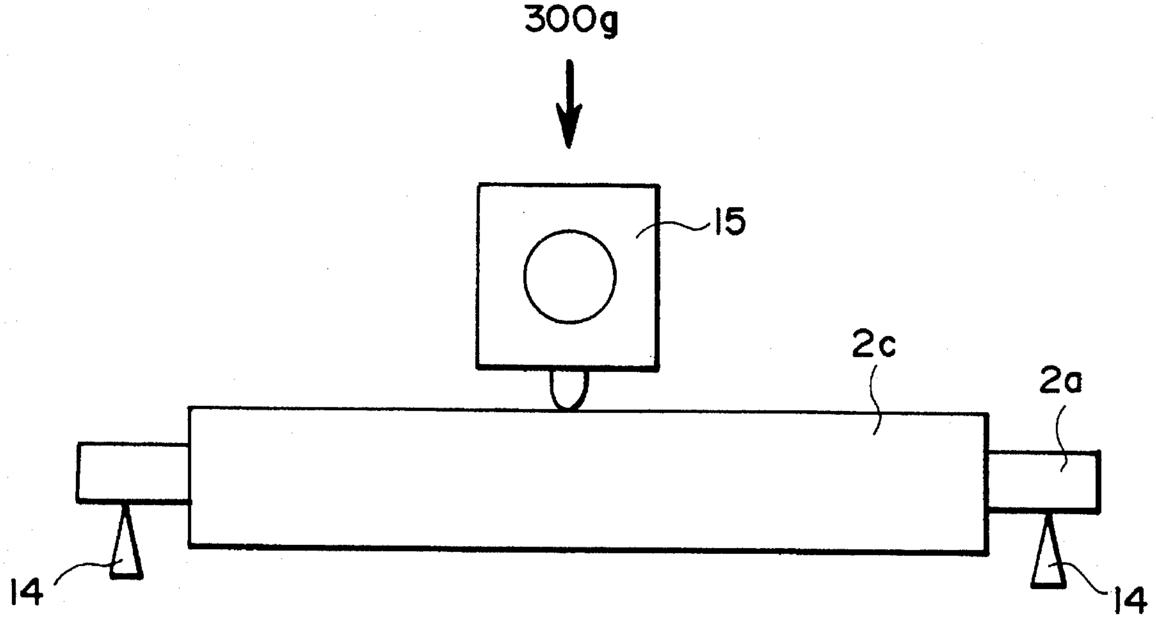
FIG. 18 illustrates a measuring method of the hardness of the charging member.

A preferable range of the hardness of the charging roller will be described. FIG. 17 is a graph of the charging noise when the hardness of the charging roller 2 is changed. The charging noise was measured under ISO 7779, section 6. FIG. 18 shows the method of measuring the hardness of the charging roller. In the Figure, a supporting table 14 supports the core metal 2*a* of the charging roller 2. Designated by a reference numeral 15 is a hardness measuring device. As shown in the Figure, 300 g is always applied, while the hardness of the charging roller 2 is measured. The other conditions were as follows:

The primary voltage frequency f=400 Hz;

Peak-to-peak voltage of the primary voltage=2.0 KV;

Thickness ratio d/t=66.3; and

Porosity VH/VT=0.42.

Under these conditions, the Asker-C hardness K of the charging roller 2 was changed. If the hardness exceeds 70 degrees, the charging noise exceeds 50 dB. This is practically no problem, but it is quite noisy. If the hardness is less than 3 degrees, the surface of the charging roller 2 is creased, a slight degree of improper charging occurs, even though it is practically no problem. If the Asker-C hardness K is not more than 60 degrees, the charging noise is 47 dB, which is no problem. If the hardness is larger than 5 degrees, the surface of the charging roller 2 is not creased at all, and there occurs no improper charging. Therefore, the preferable range of the Asker-C hardness K of the charging roller 2 is, from the standpoint of the relation between the charging noise and the improper charging, is as follows:

$$3 \text{ degrees}<K<70 \text{ degrees},$$

further preferably, $$5 \text{ degrees}<K<60 \text{ degrees}.$$

The above-described thickness of the charging part contacted to the member to be charged, the porosity of the charging member, the frequency of the oscillating voltage, and the hardness of the charging member are substantially applied to the embodiments of FIGS. 3–9.

As shown in FIGS. 1 and 2, for example, the charging roller is press-contacted by urging the opposite end portions of the core metal 2*a* by a spring 23. If the spring force thereof is small, a gap will be formed between the charging roller 2 and the photosensitive drum 1, if foreign matter enters therebetween. If this occurs, a void of charging may happen. If the spring force is too large, the charging roller 2 is pressed strongly at the opposite ends, with the result that the central portion of the charging roller 2 is away from the surface of the photosensitive drum 1, and therefore, the void of charging occurs in the center.

In order to prevent this, it is preferable that the charging roller is pressed to the photosensitive drum with a high pressure and that the nip between the charging roller and the photosensitive drum is uniform along the length thereof. In order to accomplish this, the charging roller is crowned in which the diameter of the charging roller increases from each of the opposite longitudinal ends toward the longitudinally central portion thereof.

Figure 19:
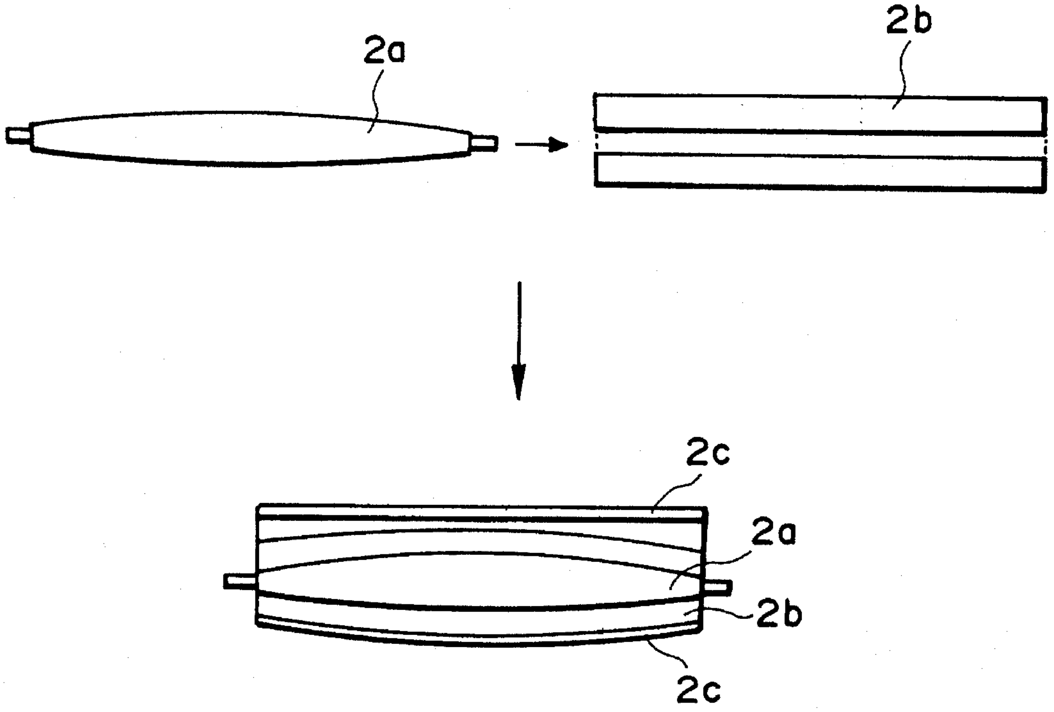
FIG. 19 is a front view illustrating a manufacturing method of the charging member.

The crowned charging roller will be described. In FIG. 19, the core metal 2*a* of steel, stainless steel or the like has been machined into a crowned shape, and it is press-fitted into a foamed layer 2*b* in the form of a tube. Then, it is inserted into the charging layer 2*c* in the form of a tube, so that a crown configuration roller is provided.

If the crown-shaped roller is used, even if the pressure applied to the end portions of the roller is increased, the central portion is not away from the member to be charged, and in addition, the roller is not away from the member to be charged even if toner, paper dust or the like enters the nip.

If thermoplastic elastomer material or rubber is used in place of the foamed material 2*b*, the vulcanization, foaming process can be omitted.

Instead of making the core metal 2*a* crowned, a straight core metal 2*a* (having the same diameter throughout the longitudinal position) is usable. In this case, after the core metal 2*a* is covered with the foamed layer 2*b*, the foamed layer 2*b* is abraded into a crowned shape.

In place of steel or stainless steel core metal (supporting member) in FIG. 19, a molded conductive shaft is usable. This is suitable for mass-production, and the abrading (into the crown shape) process can be omitted. In addition, as compared with the core metal using the metal material, it is light in weight.

In addition, n-methoxymethyl nylon, polyurethane or another high resistance resin layer 2*f* which has a larger volume resistivity than the charging layer 2*c*, may be provided on the charging layer 2*c* of FIG. 19. By coating with the resin layer in this manner, the smoothness of the surface is improved with the result of easy cleaning of the charging roller surface. As a cleaning method, the roller surface may be lightly contacted by sponge material, or a cleaning roller may be contacted and rotated. In this embodiment, the roller is crowned. If after the sponge layer is coated with an electrically conductive tube, it is dipped in resin liquid and dried, so that it is easily coated with resin layer. The resin layer on the surface layer of the crowned roller can be easily manufactured, when a heat-shrinkable tube.

In addition, the core metal and the foamed layer may be in the form of a straight cylinder, in which case the charging layer tube is crowned. The charging member shown in FIGS. 3–6, may be crowned. As for a specific crown configuration, the outer diameter of the central portion of the charging member is larger by 2% than that at the opposite longitudinal ends of the charging member. Since the charging part and the supporting part are separated in the above shown charging member, there is a problem that when the charging member is driven by the image bearing member, only the surface member deviates from the initial position to the outside of the image area with the result of improper charging.

In view of this, in this embodiment, a member for preventing the positional deviation in the longitudinal direction of the surface layer, is provided at an end of the core metal (supporting member for the charging member).

Figure 20A:
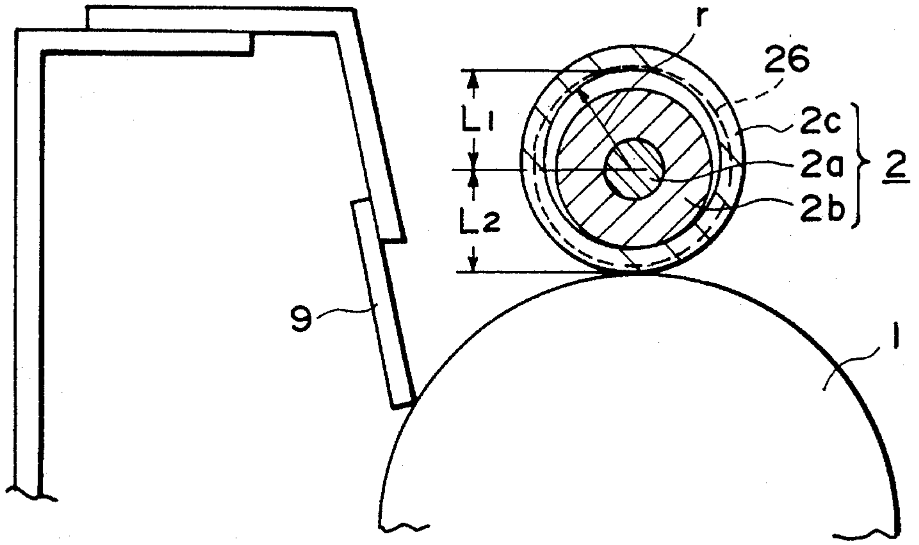
FIG. 20 is a sectional view and a front view of a charging member.
Figure 20B:
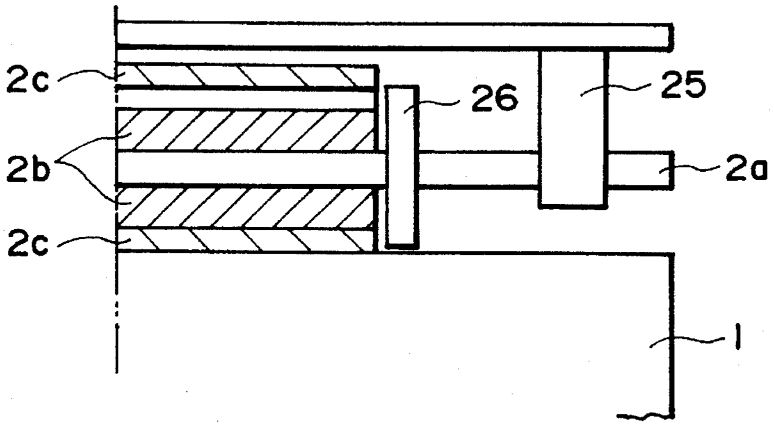
Figure 21:
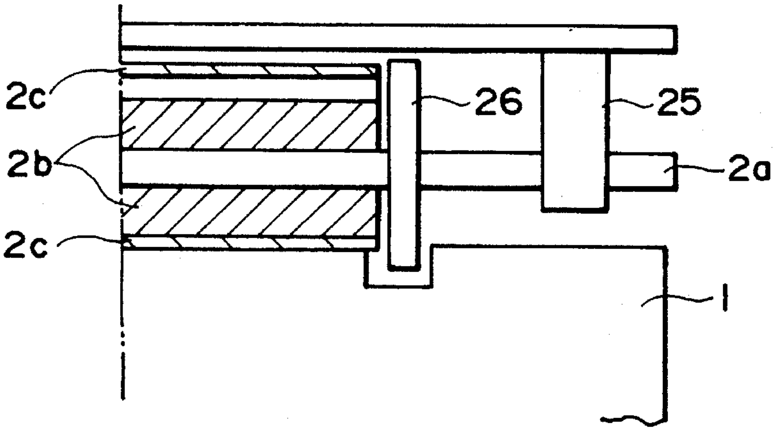
FIG. 21 is a front view in the neighborhood of an end of a charging member.

In FIG. 20A which is a schematic view in the neighborhood of the charging member, and Figures 20B and 21 are front views of the end portion of the charging member. The end portion of the core metal 2*a* supported by a bearing 25. The preventing member 26 functions to prevent the longitudinal positional deviation of the surface member 2*c*. As shown in FIG. 20B, it is integral with the core metal 2*a* at each of the longitudinal ends of the charging member 2. In FIG. 20A, it is larger than the maximum distance L1 between the core metal and the inside the surface member 2*c* and is smaller than a distance L2 between the core metal and the image bearing member. In the case of L1>L2, as shown in FIG. 21, the outer diameter of the image bearing member where the preventing member 26 is contacted to the image bearing member may be reduced, provided that r>L1 is satisfied, where r is a radius of the preventing member 26. Here, the preventing member 26 rotates substantially at the same speed as the surface member 2*c*, and therefore, there is no sliding action between the preventing member 26 and the surface member, so that the damage to the end portions of the surface member can be avoided.

The preventing member 26 functions to prevent the surface layer member 2*c* from laterally deviating in the longitudinal direction when it is driven by the image bearing member. When the charging member 2 deviates only in one longitudinal direction, the preventing member 26 may be provided only at one side of the charging member 2.

According to this embodiment, the deviation of the surface member 2*c* is prevented in the longitudinal direction, so that the improper charging can be prevented.

Figure 22A:
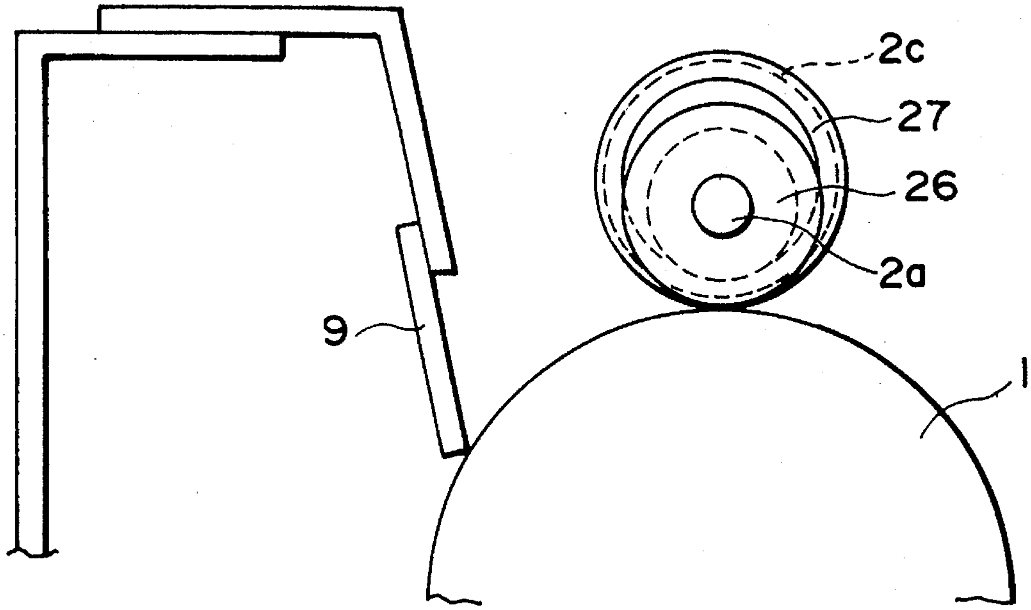
FIG. 22 is a sectional view of a charging member and a perspective view of the neighborhood of an end thereof.
Figure 22B:
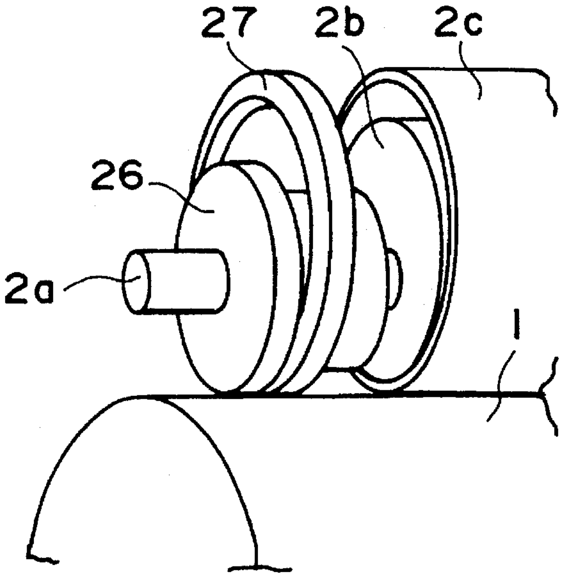

A further embodiment of the charging member will be described. FIG. 22A is a sectional view around the charging member, and FIG. 22B is a perspective view of a neighborhood of an end portion of the charging member. The member for preventing the longitudinal positional deviation of the surface member 2*c*, as shown in FIG. 22B is disposed at each of the opposite longitudinal ends of the charging member. It is in the form of a rotatable member having a stepped portion and integral with the core metal 2*a* of the charging member. It is provided with an auxiliary member 27 in the form of a ring having substantially the same diameter as the surface member 2*c*, so that when the surface member 2*c* is driven by the image bearing member, the deviation in either of the longitudinal directions, of the surface member 2*c* can be prevented. In this embodiment, the auxiliary member 27 rotates at the same speed as the surface member 2*c*, and therefore, the end portion of the surface member is not damaged. It is not necessary to change a diameter of a part of the image bearing member irrespective of L1 and L2, in FIG. 20 in the foregoing embodiment, and still it is possible to prevent the positional deviation in either of the longitudinal directions when the surface member 2*c* is driven by the rotation of the image bearing member. When the direction of the longitudinal deviation is limited to only one direction, the preventing member 26 may be provided only at one longitudinal end of the charging member 2.

According to this embodiment, the longitudinal positional deviation of the surface member 2*c* can be effectively prevented, by which the improper charging can be prevented.

A yet further embodiment of the charging member will be described, referring to FIG. 23A which is a sectional view in the neighborhood of the charging member and a front view of a neighborhood of an end portion of the charging member.

Figure 23A:
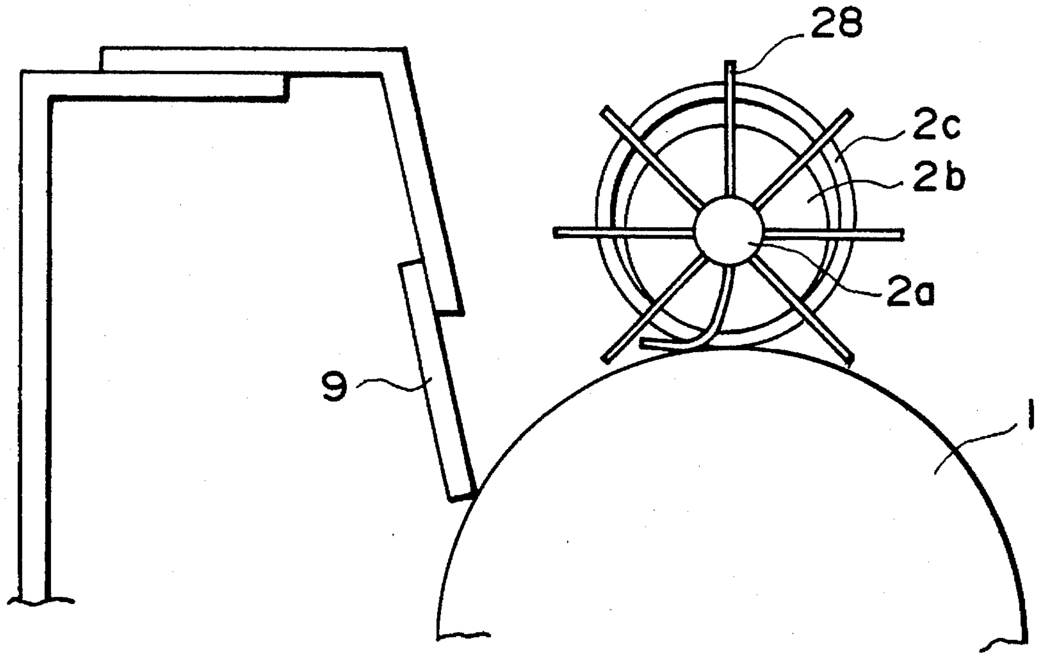
FIG. 23 is a sectional view and a front view of a charging member.
Figure 23B:
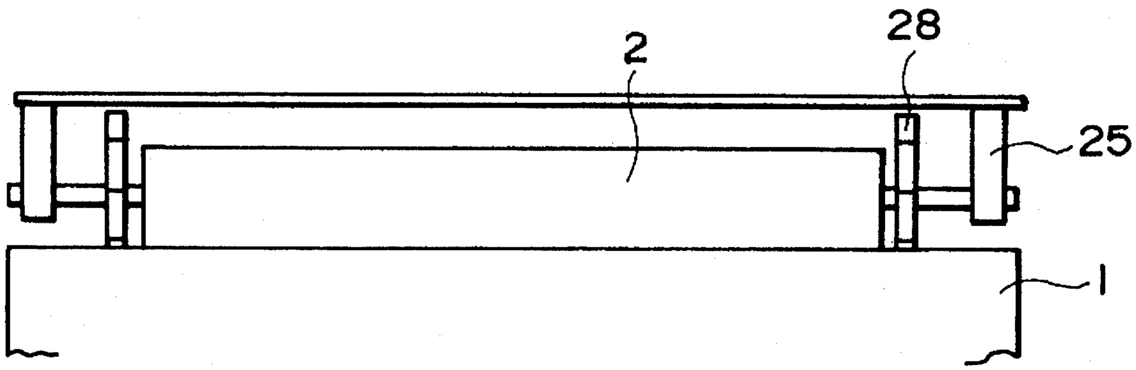

The preventing member 28 according to this embodiment is integral with the core metal 2*a* and, is provided at each of the longitudinal ends of the charging member 2, as shown in FIG. 23. As will be understood from FIG. 23A, it is in the form of a paddle. The length of the blade of the paddle is larger than a radius of the surface member 2*c*, and therefore, is effective to prevent the longitudinal deviating motion of the surface member 2*c*, but since it is made of elastic material, the rotation is smooth even if it is contacted to the image bearing member.

If the deviating longitudinal direction of the charging member 2 is limited to one direction, the preventing member 28 may be provided only at one end of the charging member 2.

According to this embodiment, the deviation of the surface member 2*c* in the longitudinal direction can be prevented, and therefore, improper charging can be avoided.

Figure 24A:
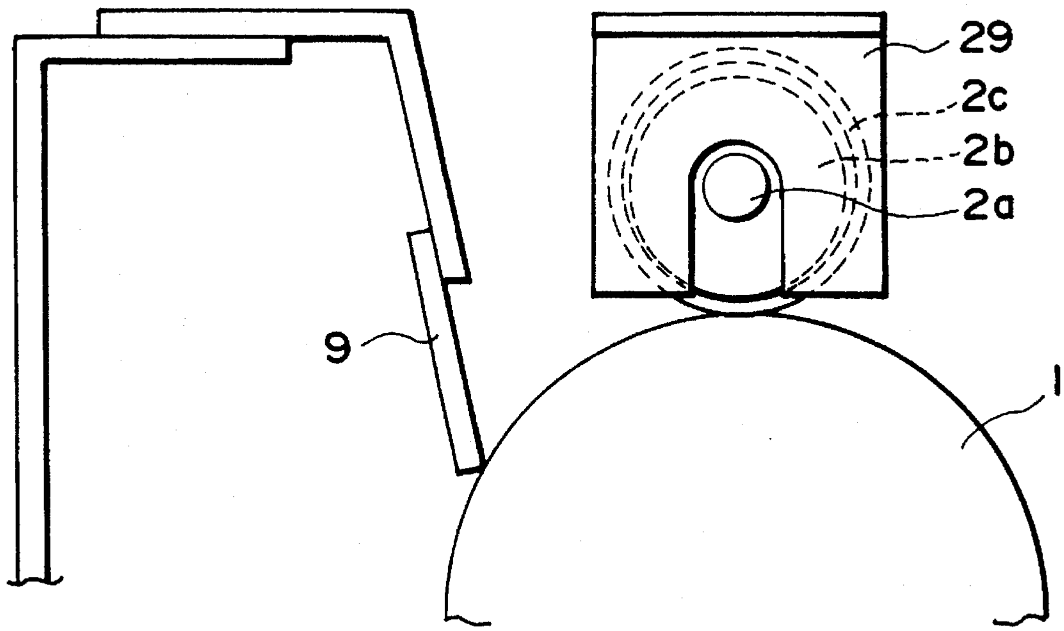
FIG. 24 is a sectional view and a front view of a charging member.
Figure 24B:
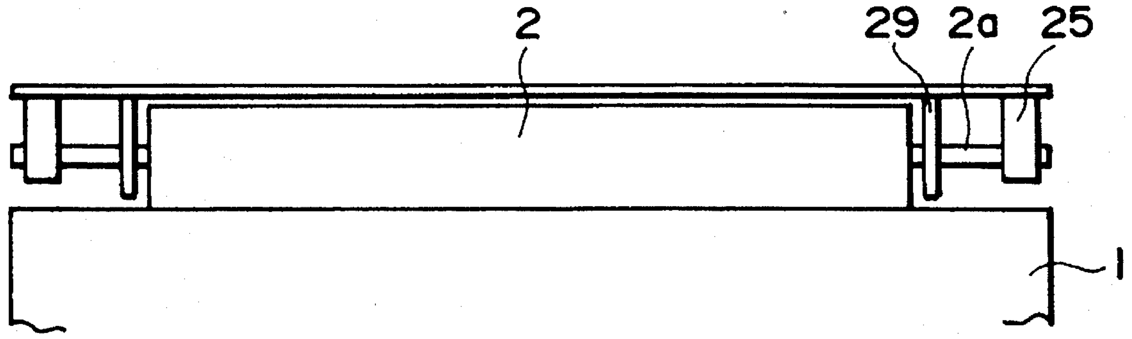

Referring to FIGS. 24A and 24B, a further embodiment of the charging device will be described.

The deviation preventing member 29 for the surface member 2*c* in this embodiment is provided at each of the longitudinal ends of the charging member 2 as shown in FIG. 24B, and is effective to prevent the surface member 2*c* from deviating in either of the longitudinal directions when it is driven by the image bearing member. When the longitudinal deviation direction of the charging member 2 is limited to one direction, it may be provided only at one end. As shown in FIG. 24A, the size of the preventing member 29 is such that it covers the radial cross-section of the surface member 2*c*, but the preventing member does not cover it adjacent the position where it is contacted to the image bearing member 1. In this embodiment, the surface member 2*c* has a diameter of 12 mm, and the preventing member 29 is made of modified polyphenylene oxide resin plate having a size of 15×15×2 mm. According to this embodiment, the deviation of the surface member 2*c* in the longitudinal direction can be prevented, so that the improper charging can be avoided.

Figure 25A:
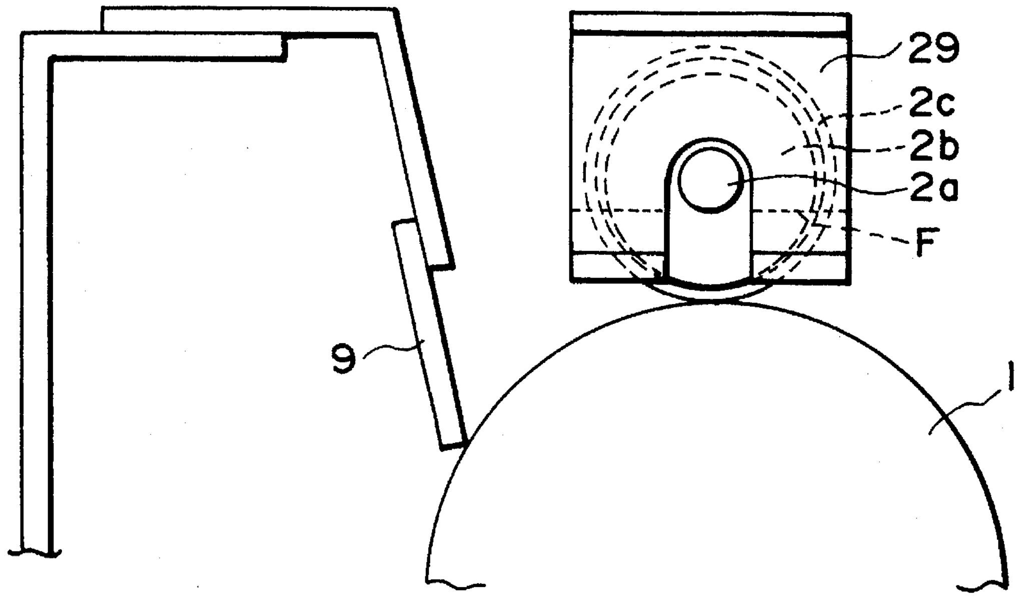
FIG. 25 is a sectional view and an end front view of a charging member.
Figure 25B:
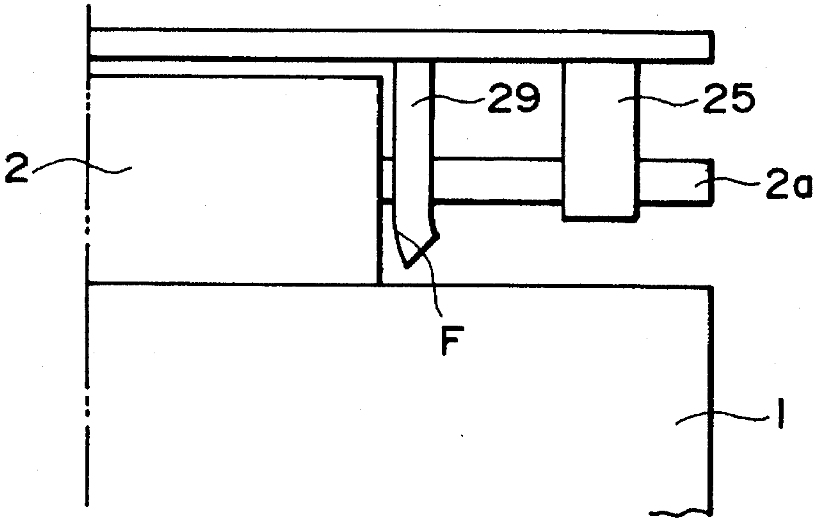

Referring to FIGS. 25A and 25B, a further embodiment of the present invention will be described. A member 29 for preventing the longitudinal positional deviation of the surface member 2*c* according to this embodiment is provided at each of the longitudinal ends of the charging member 2, as shown in FIG. 25B. It is effective to prevent the surface member 2*c* from moving in either of the longitudinal directions when the surface member 2*c* is driven by the image bearing member. In this embodiment, the preventing member 29 is provided with a partly curved surface. By doing so, even if the surface member 2*c* rotates while being in contact with the preventing member 29, the smooth contact is assured at the contact position F with the preventing member 29, and therefore, the damage to the end portion of the surface member 2*c* can be prevented. If the direction of the longitudinal direction deviation of the charging member 2 is limited to only one direction, the preventing member 29 may be provided at only one end of the charging member 2.

According to this embodiment, the deviation of the surface member 2*c* in the longitudinal direction can be prevented, and in addition, the damage to the end portion of the surface member 2*c* can be prevented, so that the improper charging can be prevented.

Figure 26A:
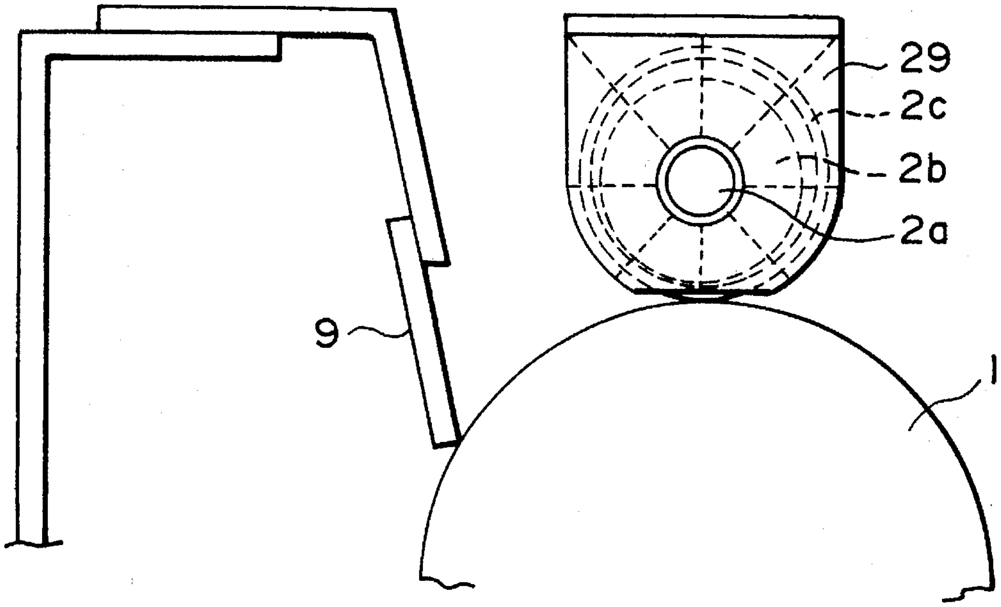
FIG. 26 is a sectional view and an end front view of a charging member.
Figure 26B:
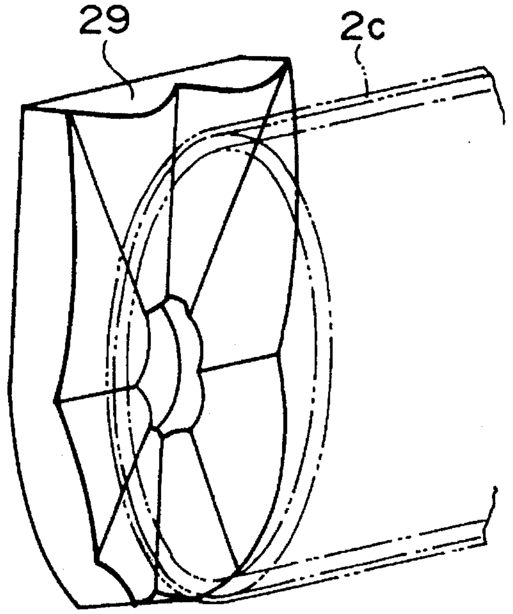

Referring to FIGS. 26A and 26B, yet a further embodiment will be described. In this embodiment, the preventing member 29 is prevented at each of the longitudinal ends of the charging member, and the surface contactable to the preventing member 29 with the surface member 2*c* has a large number of curved surfaces, by which the sliding motion relative to the charging member 2 due to the rotation of the surface member 2*c* involves a smaller contact area, and therefore, is smooth. It is effective to prevent the surface layer 2*c* from deviating in either of the longitudinal directions when it is driven by the image bearing member. If the longitudinal deviation direction of the charging member 2 is limited to only one direction, the preventing member 29 may be provided only at one end of the charging member 2.

According to this embodiment, the longitudinal deviation of the surface member 2*c* can be prevented, and in addition, the damage to the end of the surface member 2*c* can be prevented, by which the improper charging can be avoided.

Figure 27:
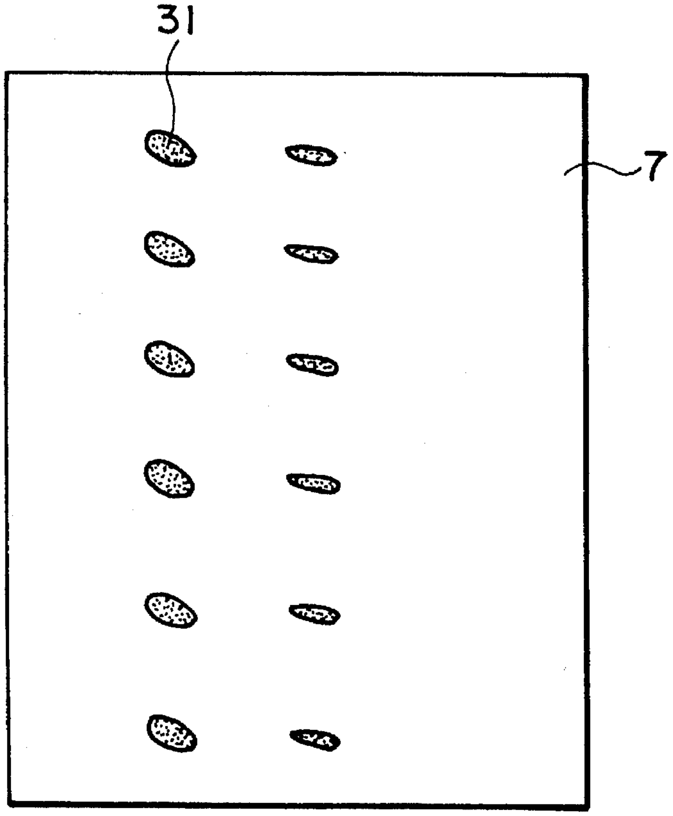
FIG. 27 is a top plan view illustrating improper charging on a transfer material.

In the charging members described above, if the urging force, of the spring 23 are different at one longitudinal end of the charging roller that at the other end, a twisting may occur between the charging part and the supporting part. For example, referring to FIG. 1, the twisting occurs between the foamed layer 2*b* and the charging layer 2*c* in the form of a tube. If this occurs, the uniform contact between the surface of the photosensitive drum and the charging member is not assured with the possible result of improper charging as shown in FIG. 27. In order to solve this problem, the charging member and the supporting portion may be partly bonded. Such an embodiment will be described.

Figure 28:
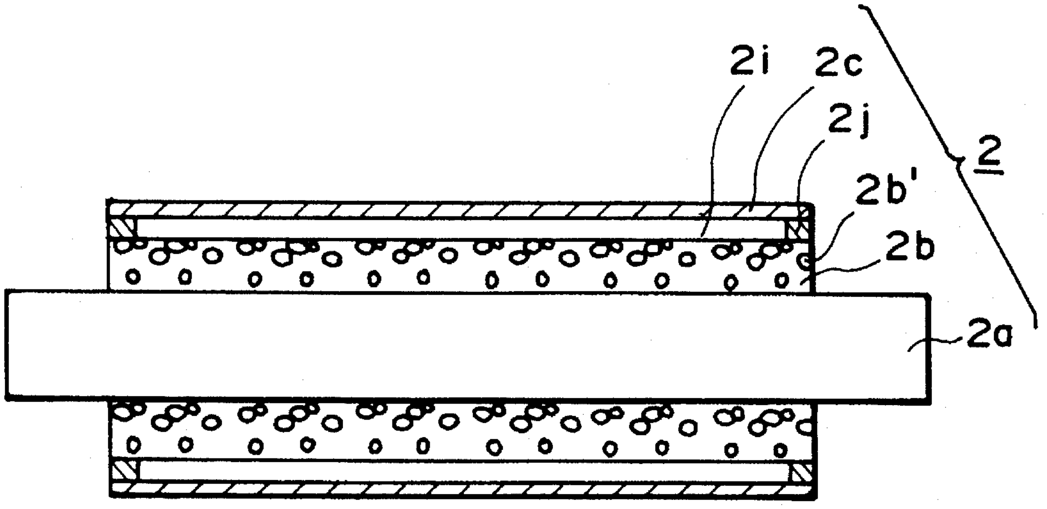
FIG. 28 is a front view of a charging member.

Referring to FIG. 28, there is shown a front view of such a charging member. Between the resistance layer and the foamed layer, there is a gap 2*i*. After the core metal 2*a* with the foamed layer 2*b* is inserted into the charging layer 2*c* tube, they are bonded by a joint 2*j* at the end portion. With this structure, when the charging roller rotates, the charging layer 2*c* and the foamed layer 2*b* are prevented from deviating or twisting in the thrust direction. In addition, since they are bonded only at small portions, the core metal and the resistance layer are substantially separate from each other. Therefore, the core metal is not vibrated by the resistance layer, and therefore, the charging noise is low.

Figure 29:
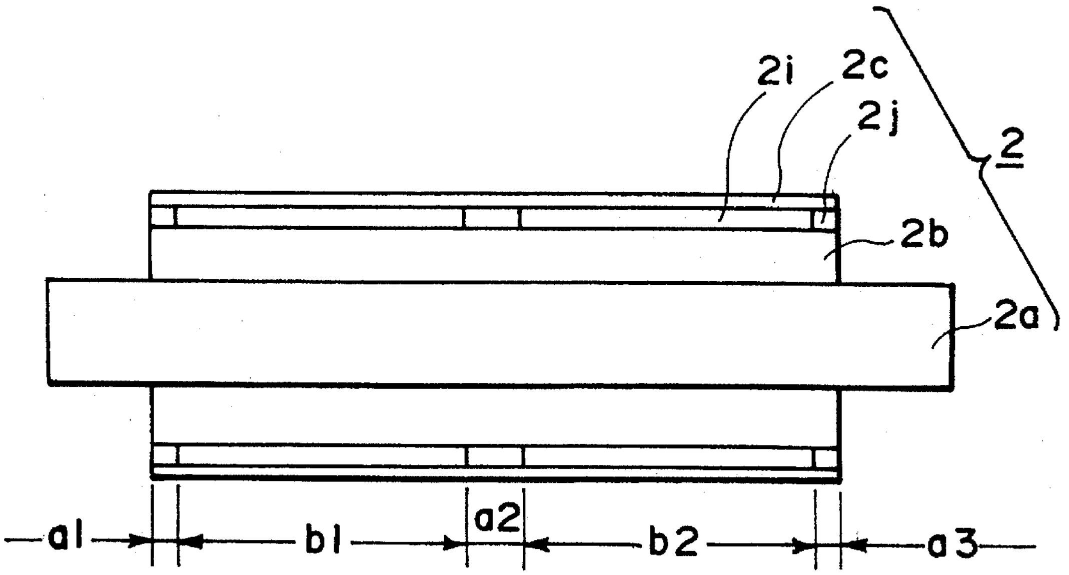
FIG. 29 is a front view of a charging member.

As shown in FIG. 29, a ratio between a non-contact area to the whole area where the charging layer 2*c* and the soft layer (such as the foamed layer) 2*b* are contacted or faced to each other, is expressed as follows:

$$w = \frac{\pi \times l}{\pi \times l} \times \frac{\sum_{m=1}^{m} b_m}{\sum_{n-1}^{n} a_n + \sum_{m=1}^{m} b_m} = \frac{\sum_{m=1}^{m} b_m}{\sum_{n=1}^{n} a_n + \sum_{m=1}^{m} b_m}$$

where $$\sum_{n=1}^{n} a_n$$

is the total area where the charging layer and the soft wafer 2*b* are bonded to each other, $$\sum_{m=1}^{m} b_m$$

is a total area where the charging layer 2*c* and the soft layer 2*b* are not bonded to each other, and 1 is a diameter of the charging roller.

Figure 30:
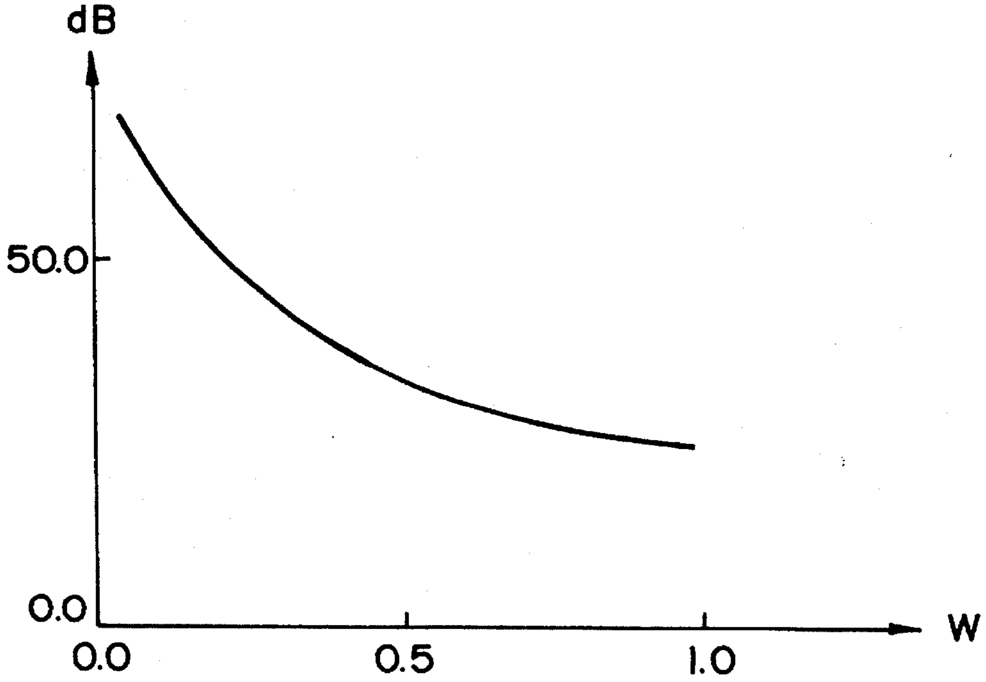
FIG. 30 is a graph of a relation between a non-bonded area ratio and the charging noise.

FIG. 30 shows measured charging noise where the area ratio w is changed. In the graph, the ordinate represents the charging noise, and the abscissa represents the non-contact area ratio w. As will be apparent from this Figure, if the area ratio w exceeds 0.2, the charging noise decreases beyond 50 dB which is a reasonable tolerable noise. Therefore, the non-contact area ratio w preferably satisfies:

$$w \geqq 0.2.$$

Figure 31A:
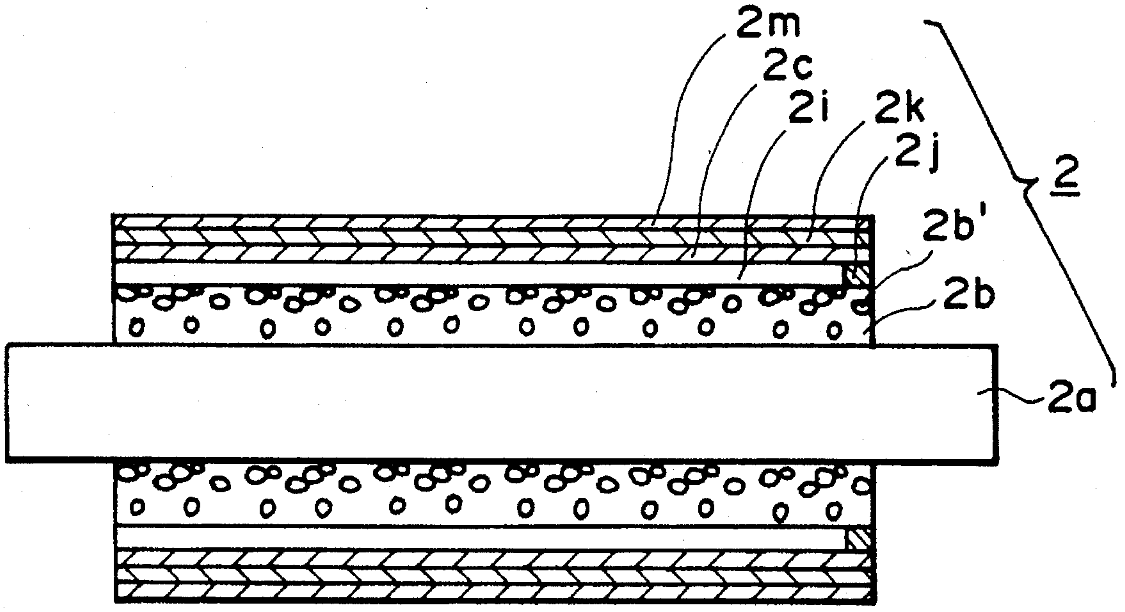
FIG. 31 is a front view of a charging member.
Figure 31B:
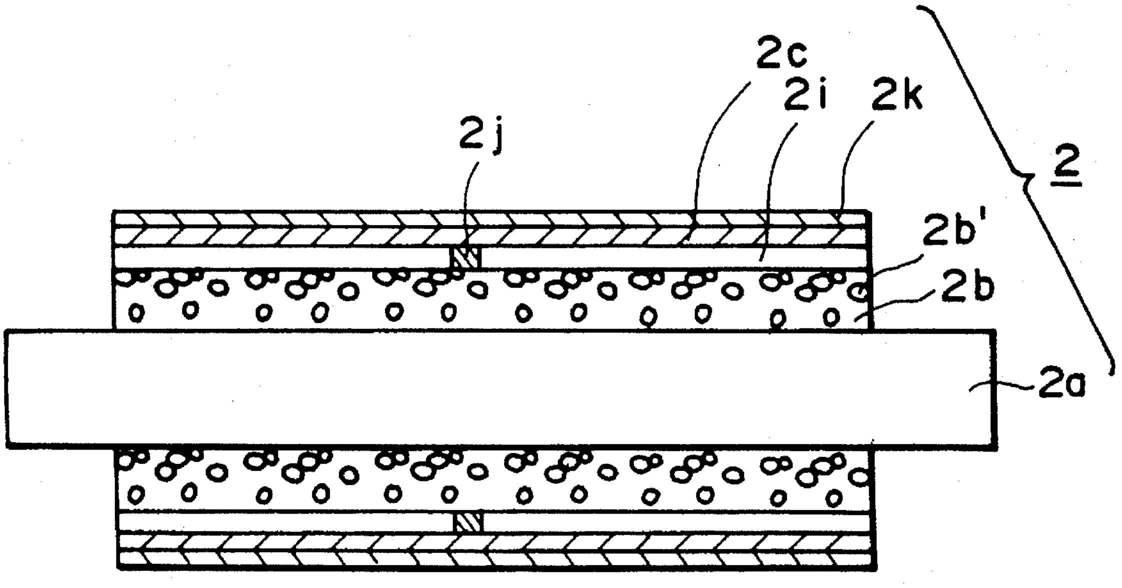
Figure 31C:
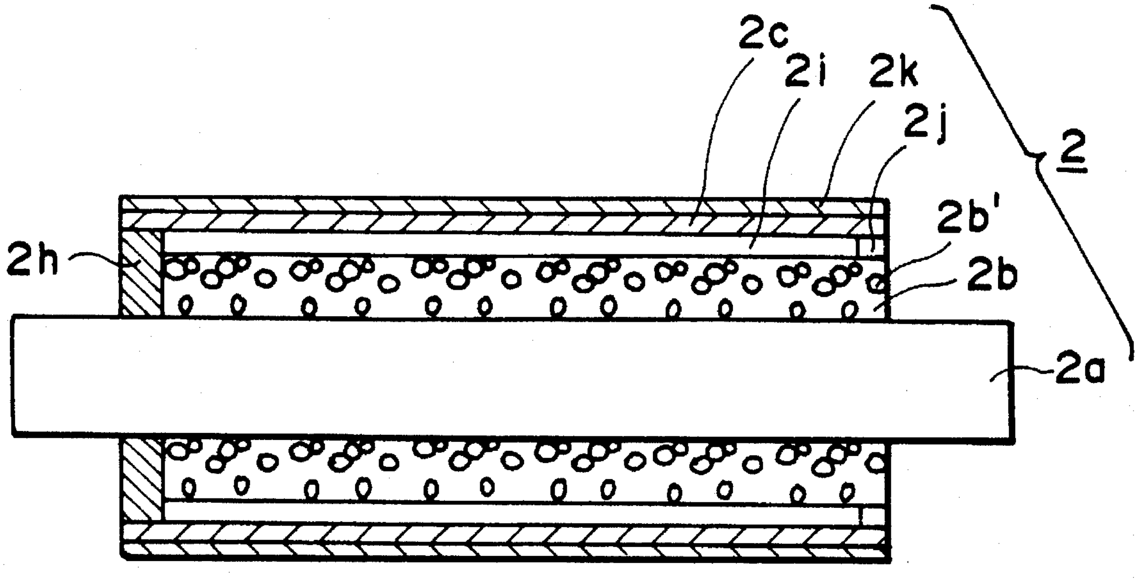

Referring to FIGS. 31A, 31B and 31C, there is shown a charging member according to a further embodiment of the present invention. In FIG. 31A, the joint 2*j* is provided only at one end of the charging roller in the longitudinal direction. The resistance layer 2*k* is of epichlorohydrin rubber having a larger volume resistivity than that of the charging layer 2*c*. The position is selected to be upstream of a position where the resistance layer 2*k* moves in the thrust direction. In the Figure, the resistance layer 2*k* tends to move from right to left in the Figure. FIG. 31B shows an example in which the joint 2*j* is disposed adjacent a longitudinal center of the charging roller. In this case, the direction of the charging roller is not considered. A protection layer 2*m* of N-methoxymethyl nylon in which carbon is dispersed functions to prevent contamination of the photosensitive drum with oil or the like which is seeped out of the resistance layer 2*k*. A conductive layer 2*c* is effective to assure the uniform charging even if pores 2*b'* in the foamed layer 2*b* are so large that the motion of the electric charge to the resistance layer 2*k* is not smooth. With this structure, not only can the improper charging attributable to the deviation of the resistance layer 2*k* or the twisting thereof be avoided, but also the contamination of the photosensitive drum by the charging roller. In addition, the manufacturing process can be simplified. The material of the foamed layer 2*b* is not necessarily electro-conductive. It may be of insulating material, if the conductive layer 2*c* is electrically connected with the core metal 2*a* through soft conductive rubber 2*n* or the like, as shown in FIG. 31C.

Figure 32:
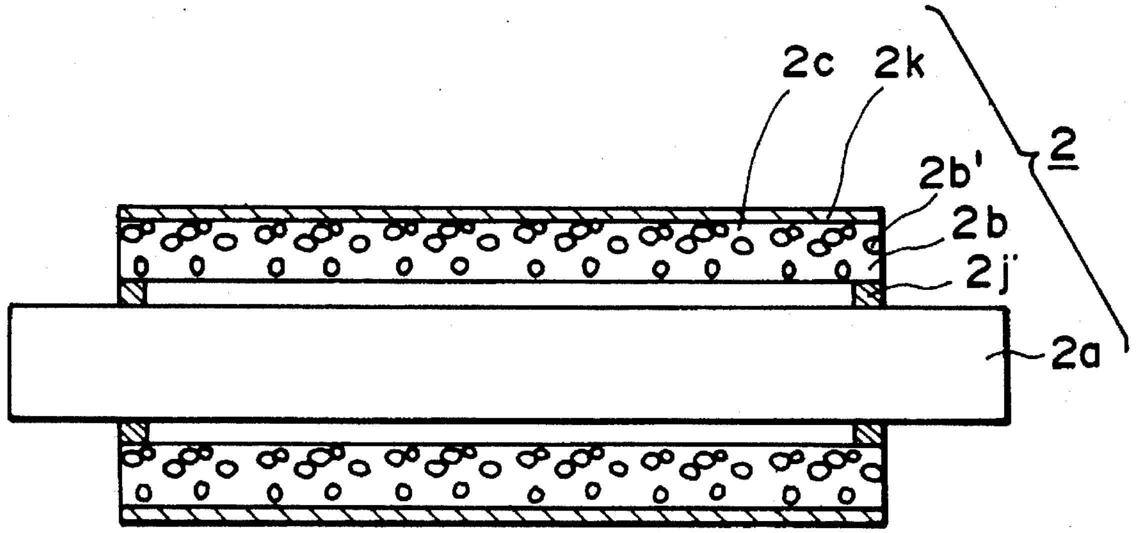
FIG. 32 is a front view of a charging member.

FIG. 32 shows an example where the core metal 2*a* and the foamed layer 2*b* are separated. The joint 2*j* connects the core metal and the foamed layer at the end portion. With this structure, when the charging roller rotates, the resistance layer 2*k* or the foamed layer 2*b* are prevented from deviating in the thrust direction.

Since the bonding is made only at a small part adjacent the ends, the core metal and the resistance layer are substantially separate, and therefore, the core metal is not vibrated by the resistance layer. Also, the charging noise level is low. The core metal is rigid, and therefore, it is easily inserted into the foamed layer in the form of a cylinder.

While the invention has been described with reference to the structures disclosed herein, it is not confined to the details set forth and this application is intended to cover such modifications or changes as may come within the purposes of the improvements or the scope of the following claims.

What is claimed is:

1. A charging member contactable to a member to be electrically charged, said charging member comprising:

a charging portion contactable to the member to be electrically charged; and a supporting portion for supporting said charging portion, wherein said supporting portion and said charging portion are substantially independently movable, said supporting portion comprising an elastic layer and a core for supporting said elastic layer, said supporting portion urging said charging portion to the member to be electrically charged.

2. A charging member contactable to a member to be electrically charged, said charging member comprising:

a charging portion contactable to the member to be electrically charged, said charging portion comprising a surface layer contactable to the member to be electrically charged and an elastic layer at a backside of said surface layer; and a core for supporting said charging portion, wherein said core and said charging portion are substantially independently movable, said core urging said charging portion to the member to be electrically charged.

3. A charging member according to claim 1, wherein the member to be electrically charged is capable of bearing an image.

4. A charging member according to claim 3, wherein said charging member is usable with a process cartridge detachably mountable to an image forming apparatus, and wherein said charging member and the member to be electrically charged are contained in the process cartridge.

5. A charging member according to claim 1, wherein said charging member is in the form of a roller.

6. A charging member according to claim 5, wherein said charging portion is in the form of a tube.

7. A charging member according to claim 1, wherein said elastic layer comprises a sponge material.

8. A charging member according to claim 1, wherein said charging portion comprises in order a conductive layer and a resistance layer, said resistance layer having a volume resistivity larger than said conductive layer in a direction toward the member to be electrically charged.

9. A charging member according to claim 1, wherein said charging member is in the form of a blade.

10. A charging member according to claim 5, wherein the relationship $2<d/t<500$ is satisfied, where t is a thickness of said charging portion, and d is a distance from a rotational axis of said charging member to a surface of said supporting portion.

11. A charging member according to claim 1, wherein the relationship $VH/VT>0.3$ is satisfied, where VT is a volume of said charging member, and VH is a volume of a cavity in said charging member.

12. A charging member according to claim 1, wherein said core is adapted to be supplied with an oscillating voltage.

13. A charging member according to claim 1, wherein said charging member has an Asker-C hardness in the range of 3 to 70 degrees.

14. A charging member according to claim 1, wherein an outer diameter of said charging member increases toward a longitudinal center thereof from each of the longitudinal ends thereof.

15. A charging member according to claim 12, wherein the oscillating voltage has a peak-to-peak voltage that is not less than twice a charge starting voltage for the member to be electrically charged.

16. A charging member according to claim 1, further comprising a limiting member, adjacent a longitudinal end of said charging member, for limiting relative movement in the longitudinal direction between said charging portion and said supporting portion.

17. A charging member according to claim 1, wherein said charging portion and said supporting portion are substantially independent movable, and wherein a part of said charging portion and a part of said supporting portion are bonded with each other.

18. A charging member according to claim 17, wherein a ratio w of an area where said charging portion and said supporting portion are not bonded with each other to an area where they are faced or contacted with each other, satisfies the relationship $w \geqq 0.2$.

19. A charging member according to claim 2, wherein the member to be electrically charged is capable of bearing an image.

20. A charging member according to claim 19, wherein said charging member is usable with a process cartridge detachably mountable to an image forming apparatus, and wherein said charging member and the member to be electrically charged are contained in the process cartridge.

21. A charging member according to claim 2, wherein said charging member is in the form of a roller.

22. A charging member according to claim 21, wherein said charging portion is in the form of a tube.

23. A charging member according to claim 2, wherein said elastic layer comprises a sponge material.

24. A charging member according to claim 21, wherein the relationship $2<d/t<500$ is satisfied, where t is a thickness of said charging portion, and d is a distance from a rotational axis of said charging member to a surface of said core.

25. A charging member according to claim 2, wherein the relationship $VH/VT>0.3$ is satisfied, where VT is a volume of said charging member, and VH is a volume of a cavity in said charging member.

26. A charging member according to claim 2, wherein said core is adapted to be supplied with an oscillating voltage.

27. A charging member according to claim 2, wherein said charging member has an Asker-C hardness in the range of 3 to 70 degrees.

28. A charging member according to claim 2, wherein an outer diameter of said charging member increases toward a longitudinal center thereof from each of the longitudinal ends thereof.

29. A charging member according to claim 26, wherein the oscillating voltage has a peak-to-peak voltage that is not less than twice a charge starting voltage for the member to be electrically charged.

30. A charging member according to claim 2, further comprising a limiting member, adjacent a longitudinal end of said charging member, for limiting relative movement in the longitudinal direction between said charging portion and said core.

31. A charging member according to claim 2, wherein said charging portion and said core are substantially independently movable, and wherein a part of said charging portion and a part of said core are bonded with each other.

32. A charging member according to claim 31, wherein a ratio w of an area where said charging portion and said core are not bonded with each other to an area where they are faced or contacted with each other, satisfies the relationship $w \geqq 0.2$.

* * * * *

UNITED STATES PATENT AND TRADEMARK OFFICE

CERTIFICATE OF CORRECTION

PATENT NO. : 5,534,344

DATED : July 9, 1996

INVENTOR(S) : HIROKI KISU, ET AL.

It is certified that error appears in the above-indentified patent and that said Letters Patent is hereby corrected as shown below:

ON THE COVER PAGE

[54] In the Title:

"CHARGER" should read --CHARGING--.

[56] References Cited

FOREIGN PATENT DOCUMENTS

"0329366 8/1989 European Pat. Off.
0458273 11/1991 European Pat. Off." should be deleted.

COLUMN 1

Line 2, "CHARGER" should read --CHARGING--.

COLUMN 2

Line 8, "diane tarpolymer)" should read --diene terpolymer)--;
Line 22, "(FIG." should read --FIG.--;
Line 23, "the core" should read --the center of the core--;
Line 37, "layer 22," should read --layer 22--; and
Line 40, "FIG. 12A" should read --FIG. 12A)--.

UNITED STATES PATENT AND TRADEMARK OFFICE

CERTIFICATE OF CORRECTION

PATENT NO. : 5,534,344

DATED : July 9, 1996

INVENTOR(S) : HIROKI KISU, ET AL.

It is certified that error appears in the above-indentified patent and that said Letters Patent is hereby corrected as shown below:

COLUMN 3

Line 24, "is" should read --are--.

COLUMN 6

Line 18, "by 2b" should read --by 2b'--;
Line 36, "310 mm;" should read --310 mm; and--; and
Line 59, "600 Hz;" should read --600 Hz; and--.

COLUMN 7

Line 32, "rod;" should read --rod; and--.

COLUMN 8

Line 2, "$10^5$ ohm.cm;" should read --$10^5$ ohm.cm; and--;
Line 6, "in in" should read --in the--;
Line 30, "is" should read --are--; and
Line 33, "2d and 2c" should read --(2d and 2c)--.

COLUMN 9

Line 2, "shaft" should read --a shaft--.

UNITED STATES PATENT AND TRADEMARK OFFICE

CERTIFICATE OF CORRECTION

PATENT NO. : 5,534,344

DATED : July 9, 1996

INVENTOR(S) : HIROKI KISU, ET AL.

It is certified that error appears in the above-indentified patent and that said Letters Patent is hereby corrected as shown below:

COLUMN 10

Line 30, "with" should read --with a--;
Line 38, "he" should read --be--;
Line 42, "Charging" should read --charging--; and
Line 67, "due" should read --due to--.

COLUMN 12

Line 51, "20. 500," should read --20 - 500,--.

COLUMN 13

Line 33, "satisfy" should read --satisfies--.

COLUMN 15

Line 29, "when a" should read --with a--.

COLUMN 17

Line 57, "force," should read --forces--.

UNITED STATES PATENT AND TRADEMARK OFFICE

CERTIFICATE OF CORRECTION

PATENT NO. : 5,534,344
DATED : July 9, 1996
INVENTOR(S) : HIROKI KISU, ET AL.

It is certified that error appears in the above-indentified patent and that said Letters Patent is hereby corrected as shown below:

COLUMN 20

Line 29, "independent" should read --independently--.

Signed and Sealed this

Fourth Day of March, 1997

Attest:

BRUCE LEHMAN

*Attesting Officer*

*Commissioner of Patents and Trademarks*